United States Patent
Tani et al.

(10) Patent No.: US 6,725,982 B2
(45) Date of Patent: Apr. 27, 2004

(54) EDDY CURRENT BRAKING APPARATUS

(75) Inventors: Yasunori Tani, Hyogo (JP); Kenji Araki, Nara (JP); Koichi Miura, Hyogo (JP); Akira Saito, Hyogo (JP); Yasutaka Noguchi, Osaka (JP); Kenji Imanishi, Osaka (JP); Keiichi Kawano, Hyogo (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 09/778,882

(22) Filed: Feb. 8, 2001

(65) Prior Publication Data

US 2002/0020592 A1 Feb. 21, 2002

(30) Foreign Application Priority Data

| Feb. 10, 2000 | (JP) | 2000-033041 |
| Feb. 10, 2000 | (JP) | 2000-033042 |
| Jun. 12, 2000 | (JP) | 2000-175383 |
| Aug. 3, 2000 | (JP) | 2000-235683 |
| Sep. 22, 2000 | (JP) | 2000-288669 |

(51) Int. Cl.[7] .................................................. B60L 7/00
(52) U.S. Cl. ..................................... 188/164; 188/156
(58) Field of Search .............................. 188/72.1, 72.4, 188/72.6, 158, 161, 162, 164, 170, 156

(56) References Cited

U.S. PATENT DOCUMENTS

| 3,673,926 A | 7/1972 | Mohri |
| 4,205,594 A | 6/1980 | Burke |
| 4,482,034 A * | 11/1984 | Baermann .................... 188/165 |
| 5,012,725 A | 5/1991 | Leary |
| 5,067,323 A | 11/1991 | Bennett et al. |
| 5,125,326 A | 6/1992 | Sarcona |
| 5,215,169 A * | 6/1993 | Kuwahara .................... 188/164 |
| 5,219,050 A * | 6/1993 | Kubomiya .................... 188/164 |
| 5,303,802 A * | 4/1994 | Kuwahara .................... 188/164 |
| 5,944,149 A * | 8/1999 | Kuwahara .................... 188/164 |

FOREIGN PATENT DOCUMENTS

| EP | 59043205 | 3/1984 |
| EP | 06086534 | 3/1994 |
| FR | 2756597 | 6/1998 |
| JP | 01298948 | 12/1989 |
| JP | 1-298948 | 12/1989 |
| JP | 4-12659 | 1/1992 |
| JP | 05-211786 | 8/1993 |
| JP | 06-086534 | 3/1994 |
| JP | 06-165477 | 6/1994 |
| JP | 06-189522 | 7/1994 |

* cited by examiner

*Primary Examiner*—Jack Lavinder
*Assistant Examiner*—Thomas Williams
(74) *Attorney, Agent, or Firm*—Clark & Brody

(57) ABSTRACT

A single row rotating-type eddy current braking apparatus for use with a rotor mounted on a powered shaft comprises a support ring, a plurality of magnets, a plurality of ferromagnetic switching plates, and a support body. The switching plates or magnets are capable of rotating with respect to each other to effect braking. The dimensions of the switching plates and angular displacement of the magnets and switching plates are controlled to minimize drag torque when in a non-braking state. The switching plates can be made to rotate and the bearing can be employed in combination with the rotating and stationary components to alleviate problems such as thermal expansion and wear. The apparatus also utilizes a pneumatic cylinder designed to rotate in the direction of the shaft rotation to achieve a braking state, and can employ a single rod double acting cylinder to switch between braking and non-braking states.

26 Claims, 17 Drawing Sheets

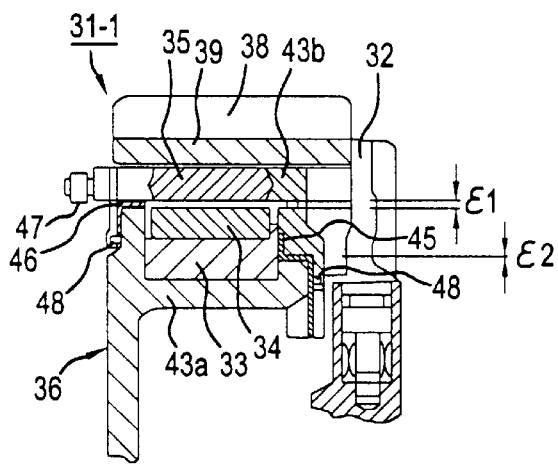
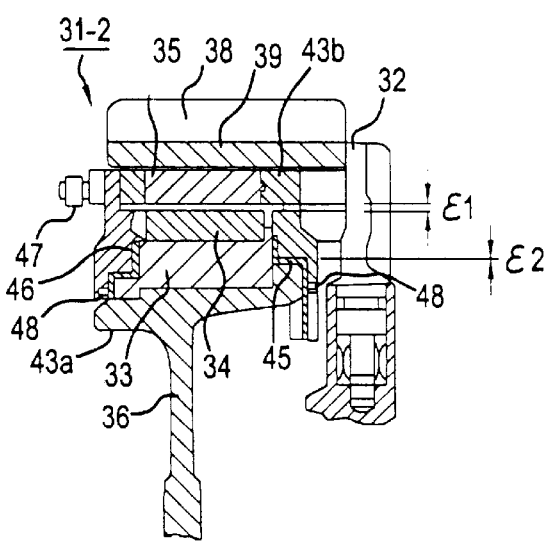
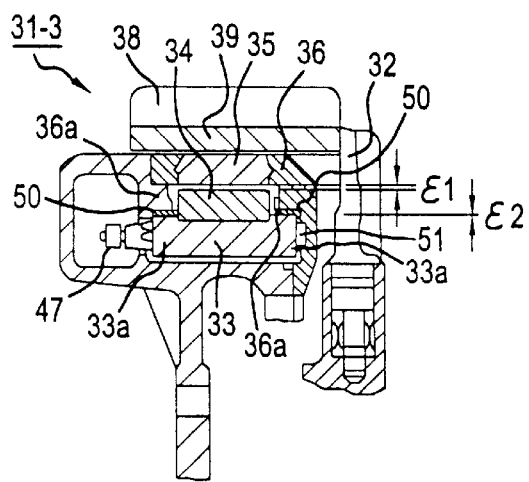
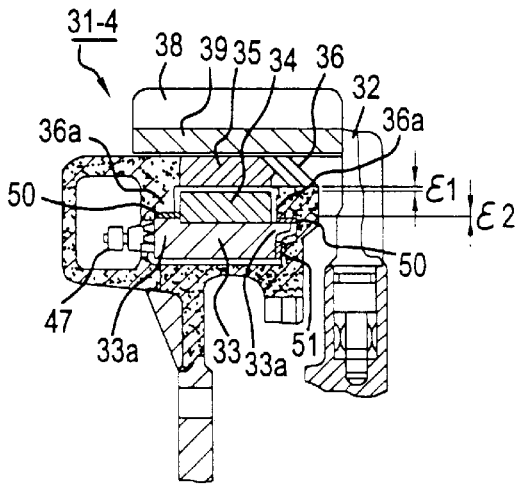

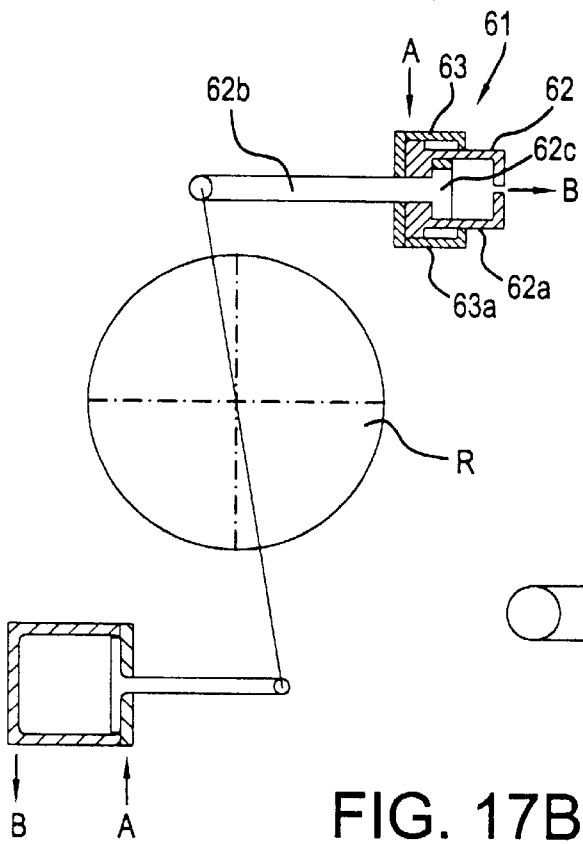
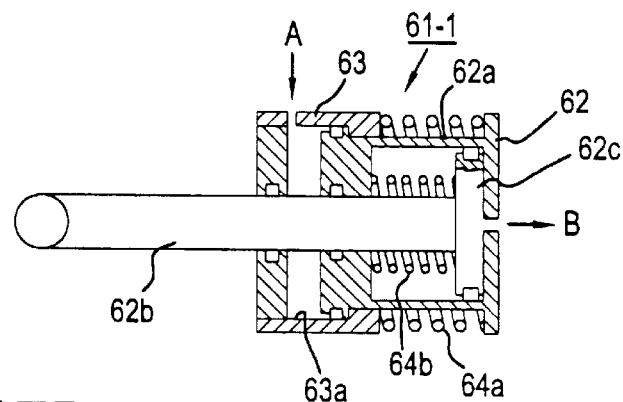
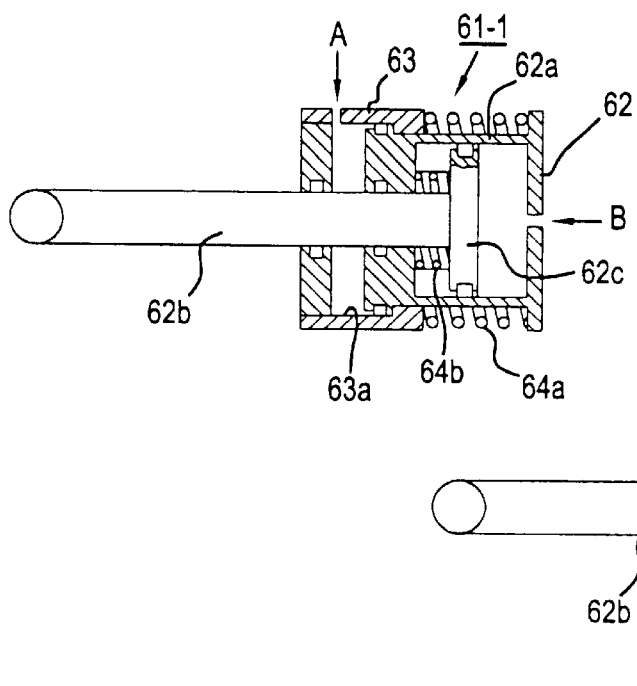
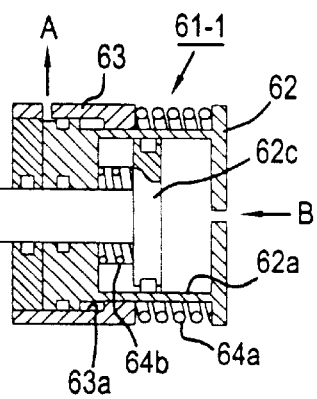

PRIOR ART

PRIOR ART

EDDY CURRENT BRAKING APPARATUS

FIELD OF THE INVENTION

The present invention is directed to an eddy current braking apparatus and, in particular, to a single-row rotating-type braking apparatus.

BACKGROUND ART

Large vehicles such as buses and trucks are equipped with a foot brake as a main braking apparatus. In addition, these large vehicles are equipped with an exhaust brake as an auxiliary braking apparatus (retarder). Furthermore, on a portion of an output shaft or a power transmission shaft such as the rear of the transmission or the midportion of a propeller shaft, these large vehicles are equipped with an eddy current braking apparatus as an auxiliary braking apparatus. An eddy current braking apparatus performs stable deceleration even on a long downhill slope, and it decreases the frequency of use of a foot brake. For this reason, abnormal wear of brake linings and the occurrence of fading can be prevented, and the braking distance can be shortened. Typically, electromagnets and permanent magnets are used as the magnets for generating the magnetic force in these types of eddy current braking apparatuses, with permanent magnets being used more since no electric current is required during braking.

One type of an prior art eddy current braking apparatus used in the prior art is a single-row rotating-type eddy current braking apparatus 1 using permanent magnets as shown in FIG. 30 and disclosed in Japanese Published Unexamined Patent Application Hei 1-298948. The eddy current braking apparatus 1 has a support body 4 made of a non-magnetic material such as an aluminum alloy casting. The body 4 is supported with respect to an output shaft or a power transmission shaft 2 such as the rear of a transmission or a propeller shaft of a large vehicle (collectively referred to below in this specification as a "power transmission shaft") by bearings 3. The support body 4 has a support ring 5, which serves as a yoke and is made of steel, for example, and is rotatably supported through bearings 6.

A plurality of permanent magnets 7 are disposed on the outer peripheral surface of the support ring 5. The magnets 7 are disposed at constant intervals in the circumferential direction of the support ring 5, with the polarity of adjoining magnets being opposite from each other. A plurality of switching plates 8 made from a ferromagnetic material are magnetically insulated from each other, and are disposed on the support body 4 with a prescribed separation from the outer peripheral surface of the plurality of permanent magnets 7.

A rotor 9 is mounted on the power transmission shaft 2 with the inner peripheral portion of a cylindrical surface 9a thereof opposing the switch plates 8 with a prescribed separation therefrom. The support ring 5 is designed to rotate by only a prescribed angle with respect to the support body 4.

Still referring to FIG. 30, reference number 4a indicates an installation portion for installing the support body 4 on its mounting member, and reference number 9b indicates a cooling fin for radiating heat of the rotor 9.

FIG. 31 shows another type of an eddy current braking apparatus 10 that is a two-row rotating type and which is disclosed in Japanese Published Examined Patent Application Hei 7-118901. The apparatus 10 has a rotor 12 mounted on a power transmission shaft 11. A permanent magnet group 13 is supported by a fixed support ring 14 from the fixed side opposing the rotor 12, and the magnets of group 13 are arranged with a predetermined spacing in the circumferential direction of the fixed support ring 14 with the north poles and the south poles alternating with each other. The apparatus 10 has a moveable support ring 16 which can rotate with respect to the fixed support ring 14. Another permanent magnet group 15 is mounted on the moveable support ring 16. Bearings 18 permit sliding movement between the support ring 16 and the support body 4. A plurality of ferromagnetic switching plates 17 are disposed between the rotor 12 and the permanent magnet groups 13 and 15. The switching plates 17 extend from above the permanent magnets 13 of the fixed support ring 14 to above the moveable support ring 16.

The apparatus of FIGS. 30 and 31 are not without their drawbacks though. Single-row rotating-type braking apparatus such as that shown in FIG. 30 exhibit a drag torque during a non-braking state that is higher than for the two-row rotating-type eddy current braking apparatus 10 shown in FIG. 31. Consequently, single row eddy current braking apparatus 1 have not gained acceptance at the present time.

However, these single row eddy current braking apparatus can be beneficial in that their use can greatly decrease the number of braking components such as permanent magnets 7, support rings 5, and the retaining members that support the permanent magnets 7 and the support rings 5. Thus, the use of these types of eddy current braking apparatus increases durability and reliability, and lowers the cost of manufacturing. Furthermore, the single row eddy current braking apparatus can restrict the magnet rotational angle to about half that of the permanent magnets 15 of the double row eddy current braking apparatus, thereby permitting a decrease in the size of pneumatic cylinders employed for driving the permanent magnets 15 and a decrease in air consumption.

A further advantage of single row eddy current braking apparatus relates to the size of the pneumatic cylinder used to alternate between braking and non-braking states. Switching from a braking state to a non-braking state is typically accomplished simply by rotating the support ring 5 such that two adjoining switching plates 8 are each straddled by a permanent magnet 7. The magnetic force of permanent magnets 7 and the attractive force between the permanent magnets 7 and the opposing switching plates 8 is larger than for two-row eddy current braking apparatus 10 of FIG. 31. Consequently, the stroke of a pneumatic cylinder for driving the support ring 5 of the single row braking apparatus can be reduced by about half. As a result, the length of the pneumatic cylinder can be decreased, thereby reducing costs, installation fits problems, and air consumption. However, although the stroke or magnet rotational angle is reduced with a single-row eddy current braking apparatus, the required force to rotate the magnet is not reduced.

Although the single-row eddy current braking apparatus have advantages over two-row current braking apparatus, another problem of drag torque in the non-braking state exists. Referring to FIGS. 30, 32a, and 32b, the non-braking state in the single-row eddy current braking apparatus is achieved by rotating the support ring 5 from the braking position shown in FIG. 32a so that the permanent magnets 7 straddle adjoining switching plates 8 and overlap half of each one. As shown by the arrows in FIG. 32b, a short circuited magnetic circuit is formed by the support ring 5, adjoining permanent magnets 7, and one of the switching plates 8. Therefore, magnetic flux from the permanent magnets 7 no longer acts on the cylindrical portion 9a, eddy currents do not flow in the cylindrical portion 9a, a so-called non-braking state is assumed, and the braking torque disappears.

To achieve the braking state as shown in FIG. 32a, the support ring 5 is rotated so that the permanent magnets 7 are aligned with the switching plates 8. In this state, a magnetic circuit shown by the arrows is formed by the support ring 5, the adjoining permanent magnets 7, the adjoining switching plates 8, and the cylindrical portion 9a of the rotor 9. As a result, the flux from the permanent magnets 7 acts on the cylindrical portion 9a and generates eddy currents, and a so-called braking state occurs whereby a braking torque is generated.

In the non-braking state shown in FIG. 32b, ideally no braking torque (drag torque), which acts as running resistance, is generated at all. However, in actual practice, as shown by the dashed line in FIG. 32b, a leakage flux occurs where the permanent magnets 7 are not covered by the switching plates 8. This leakage flux acts on the cylindrical portion 9a of the rotor 9 to generate the drag torque.

A solution to the above-described drag torque problem has been proposed in each of Japanese Published Unexamined Patent Application Hei 5-211761, Hei 6-165477, Hei 6-189522, and Hei 6-86534.

Japanese Published Unexamined Patent Application Hei 5-211761, as shown in FIG. 33a, discloses an eddy current braking apparatus having an opening 7a formed in the central portion in the circumferential direction of a permanent magnet 7. The central portion is not covered by a switching plate 8 during a non-braking state. Alternatively, and as shown in FIG. 33b, this same application discloses a permanent magnet 7 with cutouts 7b and 7b formed in both sides in the circumferential direction. By decreasing the area of the portion of the permanent magnet 7 that is not covered by the switching plate, the leakage flux that may be present when portions of the permanent magnets 7 of the apparatus that are not covered by the switching plates 8 in the non-braking state is decreased.

Japanese Published Unexamined Patent Application Hei 6-165477, as shown in FIG. 34, discloses an eddy current braking apparatus whereby magnets 19 having an opposite polarity to that of permanent magnets 7 are disposed in the central portion in the circumferential direction of permanent magnets 7, i.e., the portion not covered by the switching plates 8 during a non-braking state. With this type of a magnet, a short circuited magnetic circuit between permanent magnets 7 and magnets 19 appears during the non-braking state, and the generation of drag torque is suppressed.

Japanese Published Unexamined Patent Application Hei 6-189522, as shown in FIG. 35, discloses an eddy current braking apparatus wherein the magnets 7 have a recess 7c formed in the central portion in the circumferential direction of the magnet 7, which is not covered by a switching plate 8 during a non-braking state. The recess 7c reduces the volume of the portion of the permanent magnet 7, which is not covered by the switching plate 8. Therefore, the leakage flux from the portion that is not covered by a switching plate 8 during a non-braking state is decreased.

Japanese Published Unexamined Patent Application Hei 6-86534, as shown in FIG. 36, discloses an eddy current braking apparatus wherein ferromagnetic pole materials 20 are provided at each end of each permanent magnet 7. The materials 20 project towards the switching plates 8 from the outer peripheral surface of each permanent magnet 7 at both ends thereof in the circumferential direction. The leakage flux from the portion which is not covered by the switching plates 8 in a non-braking state is decreased as a result of the increased spacing between the magnets 7 and the rotor 9a.

While the aforementioned prior art apparatus may reduce the drag torque in a non-braking state, these apparatus suffer from a lack of braking torque during the braking state.

More specifically, each of the apparatus disclosed in Japanese Published Unexamined Patent Applications Hei 5-211761, Hei 6-165477, and Hei 6-189522, (FIGS. 33–35) has a weakening of the magnetic force in the portion of the permanent magnets 7 not covered by the switching plates 8 in a non-braking state, i.e., in the central portion in the circumferential direction. Therefore, while it is in fact possible to obtain a decrease in leakage flux during a non-braking state, the braking torque during a braking state necessarily decreases as well. Furthermore, it is necessary to form difficult-to-work permanent magnets into complicated shapes, and manufacturing costs increase.

In the eddy current braking apparatus disclosed in Japanese Published Unexamined Patent Application Hei 6-86534 (FIG. 36), the separation between the switching plates 8 and the permanent magnets 7 unavoidably becomes large. Therefore, the distance between the permanent magnets 7 and the cylindrical portion 9a of the rotor 9 also becomes large, and the magnetic flux density, which reaches and acts on the cylindrical portion 9a of the rotor 9 during a braking state decreases. In particular, a gap formed between the switching plates 8 in the central portion in the circumferential direction of the permanent magnets 7 all the more decreases the flux, which is generated in the central portion in a circumferential direction of the permanent magnets 7. For this reason, the braking torque during a braking state decreases.

Besides a loss of braking torque, the differences in the coefficients of thermal expansion for the materials of the apparatus can require an increased amount of high cost magnetic material, thus increasing the overall apparatus cost. Referring again to FIGS. 30–36, this increased amount of magnetic material derives from having to adjust the gap between the switching plates 8 and the permanent magnets 7 and the gap between the support body 4 and the bearings 6 to take into consideration changes in temperature during apparatus operation.

The temperature of an eddy current braking apparatus 1 at the time of starting of a vehicle, assuming an extremely cold region, is −20 to −30° C. On the other hand, the temperature of the eddy current braking apparatus 1 during running can rise to 70–90° C. due to heating by heat transmitted from the rotor 9. The support body 4 of the eddy current braking apparatus 1 is generally made of an aluminum alloy casting or the like in order to be lightweight, non magnetic, and heat radiating. For this reason, the support body 4 has a high coefficient of thermal expansion, and the support body 4 has much larger changes in dimensions due to temperature variations than the bearings 6 or the support ring 5, each being made of steel.

For this reason, the size $\epsilon 1$ of a gap between the switching plates 8 and the permanent magnets 7 must be set to a large value taking into consideration the maximum shrinkage of the support body 4. With this arrangement, even at the lowest temperature at the time of starting of a vehicle, even if the support body 4 which is made from an aluminum alloy casting shrinks to its smallest size, the switching plates 8 and the permanent magnets 7 will not interfere with each other. On the other hand, the size $\epsilon 2$ of a gap between the support body 4 and the bearings 6 must be set to a large value to account for the maximum expansion of the support body 4. With this spacing, even when the support body 4, which is made of an aluminum alloy casting, is heated to a maximum temperature during running and expands by a maximum amount, a suitable gap is maintained for the bearings 6. Furthermore, when the lowest temperature occurs, such as when the vehicle is started, the size of the gap $\epsilon 2$ increases due to the difference in the coefficient of thermal expansion between the bearings 6 which are made of steel, and the support body 4, which is made of an aluminum alloy casting.

For this reason, in order to set gap size $\epsilon 1$, it is necessary to take into consideration the maximum value of gap size $\epsilon 2$. Accordingly, as shown in FIGS. 30–36, in the conventional structure in which the steel support ring 5 is supported on the outer peripheral surface side of the support body 4 made from an aluminum alloy casting, it is necessary to set gap size $\epsilon 1$ at quite a large value. The size $\epsilon 1$ of this gap thus causes of an increase in magnetic resistance in the magnetic circuit, which is formed during a braking state, and it decreases the efficiency of the magnetic circuit. In addition, due to the increased gap and reduced efficiency, the amount of the high cost material forming the permanent magnets 7 must be increased, thereby increasing the manufacturing costs of the single-row rotating-type eddy current braking apparatus shown in FIG. 30.

Furthermore, in the conventional structures shown in FIGS. 30–36, shifting between a braking state and a non-braking state is carried out by rotating the support ring 5 with respect to the support body 4 at a high speed. For this reason, in order to prevent the magnets 7 from falling off, it is necessary to strongly secure them to the support ring 5, and a high dimensional accuracy is required of the surfaces in the support body 4 forming the gaps having the sizes $\epsilon 1$ and $\epsilon 2$. In addition, the sliding surface of the support body 4 that opposes the bearings 6 must undergo hardening treatment and the like in order to increase its durability. As a result, the manufacturing costs of the eddy current braking apparatus of FIG. 30 are enormously increased.

Another problem associated with single-row rotating type eddy current braking apparatus is the necessity of using the right size actuator for rotation, but at the same time having an actuator that is low cost and small in size. In general, the forces required to cause rotation in single-row rotating-type eddy current braking apparatus require actuators that are large.

In the single-row type braking apparatus, in order to switch between generating and turning off a braking force, it is necessary to rotate the support ring 5. The rotation of the support ring 5 is normally carried out by connecting various types of actuators such as a hydraulic cylinder or a pneumatic cylinder or a drive source such as an electric motor to a yoke link protruding from the side surface of the support ring 5. However, in many cases, a large vehicle such as a truck or a bus is equipped with a compressed air source. For this reason, it is convenient to use a pneumatic cylinder as the drive source for the support ring 5 in a single-row rotating-type eddy current braking apparatus. Furthermore, in order to stop the support ring 5 in at least two stopping positions, a double-acting cylinder is often employed.

FIGS. 37a and 37b show an exemplary double acting cylinder, disclosed in Japanese Published Unexamined Utility Model Application Hei 6-48386, that is intended for use with a two-row rotating-type eddy current braking apparatus. In this cylinder, a stepped piston 22 is arranged within a stepped cylinder 21. In addition, a piston 23 is arranged within an open-ended and smaller diameter cylindrical portion of the piston 22. A rod 24 extending from the piston 23 passes through an opening in the closed end wall of piston 22, through an opening in the large diameter end wall of cylinder 21, and projects to an exterior of the cylinder. By switching the supply of compressed air to both end walls of cylinder 21, a support ring (not shown) connected to the rod 24 can be stopped in a non-braking position, a partial braking position, and a braking position, for a total of three positions. It should be understood that a partial braking position means a condition between a non-braking state and a braking state, i.e., not a complete braking state.

When the support ring 5 is driven by a pneumatic cylinder, as shown in FIG. 32a, it is necessary for the pneumatic cylinder to generate a greater force than the magnetic attraction force generated by the magnetic circuit formed by the support ring 5, adjoining permanent magnets 7, adjoining switching plates 8, and the cylindrical portion 9a of the rotor. FIG. 38 shows the relationship between the stroke s of a pneumatic cylinder and the required force $F_1$ for the pneumatic cylinder to rotate the support ring 5 from a non-braking state to a braking state, to maintain this state, to rotate the support ring 5 from the braking state to the non-braking state, and to maintain that state.

The force $F_1$ that is required in this case varies with the position of the support ring 5. More specifically, the required force $F_1$ reaches a maximum value $F_{max}$ at point A between point O (non-braking state) and point E (braking state). Therefore, the pneumatic cylinder for driving the support ring 5 must generate a thrust of at least the required force $F_{max}$ at this point A. The force required to release the braking state, i.e., the required force $F_B$ at point B is smaller than the force required during braking, i.e., the required force $F_{max}$ at point A.

As described above, when a single-row rotating-type eddy current braking apparatus is mounted on a large vehicle, it is conceivable to use a pneumatic cylinder as an actuator for rotatably driving the support ring 5. In this case, the pressure of the compressed air, which is supplied to the pneumatic cylinder is 7–9 kgf/cm$^2$. The force necessary to rotate the support ring 5 by the pneumatic cylinder depends on the size of the magnets (magnetic force) and the rotational speed of the rotor 9 (which is generally in the range of 0–4000 rpm). For this reason, it is necessary to choose a pneumatic cylinder matching the maximum force required within the rotational speed range of the rotor 9. In this manner, the pneumatic cylinder size should match the maximum force required within the normally used rotational speed range of the rotor 9.

However, it is not always possible to conveniently match the pneumatic cylinder to the required force in the confines of the braking apparatus mounting location. An eddy current braking apparatus is frequently installed in a cramped region such as within an engine compartment or beneath a floor. For this reason, it is desired that a single-row rotating-type eddy current braking apparatus have a small size. As one step in decreasing the size of an eddy current braking apparatus, it is desirable to decrease the size of the pneumatic cylinder. For this reason, a pneumatic cylinder having as small a force as possible and as low consumption of air as possible, i.e., one having a small size and a high efficiency is required. However, if such a small pneumatic cylinder is used, there is the danger of it being unable to generate the maximum force needed in the normal rotational speed range of the rotor 9.

With a conventional single-row rotating-type eddy current braking apparatus, if it is attempted to decrease the cost and size of the overall apparatus by decreasing the size of the pneumatic cylinder for rotationally driving the support ring 5, there is the danger that the force of the pneumatic cylinder will be inadequate and the support ring can not be driven with certainty. On the other hand, if a pneumatic cylinder which can generate a prescribed force is used so as to rotationally drive the support ring with certainty, decreases in costs and size cannot be expected. Accordingly, in the known single-row rotating-type eddy current braking apparatuses, it is difficult to achieve both operation of the support ring 5 with certainty and decreases in the costs and the size of the overall apparatus at a high level.

The external force applied to the support ring 5 is determined by adding the reaction force of the braking torque received by the support ring 5 and the magnetic repulsive force (attractive force) generated due to the overlap between the permanent magnets 7 and the switching plates 8. For this reason, the position maintaining force for maintaining the piston 23 stopped at the partial braking position M must be larger than the external force applied to the support ring 5. Here, the position maintaining force is obtained as the difference between the force on the stepped piston 22 and on the force on piston 23, which is fit into the hollow portion thereof when in the position shown in FIG. 37b.

When the piston 23 is moved from a non-braking state shown by point O in FIG. 38 to the partial braking position M, a piston 23 having a diameter which can generate a thrust exceeding the required force $F_{max}$ at point A is necessary. Furthermore, in order to stop and maintain piston 23 at the partial braking position M, a stepped piston 22 having a diameter so as to just stop the thrust of piston 23 is necessary.

For this reason, if an actuator like that shown in FIGS. 37a and 37b having three operating positions is used, in order to increase the stability at the partial braking position M, it is necessary to make the diameter of stepped piston 22 considerably larger than the diameter of piston 23. For this reason, the diameter of the actuator itself becomes large and the amount of air that is consumed becomes extremely excessive. Accordingly, it becomes difficult to mount it on a large vehicle.

On the other hand, moving to and maintaining the partial braking position M from E (braking state) against the resistance of piston 23, a stepped piston 22 having a large diameter is necessary. For this reason, the diameter of the actuator becomes large and the amount of air that is consumed becomes excessive, and it is difficult to mount it on a large vehicle.

The inability to maintain the partial braking position can also affect the responsiveness of movement for the other braking states as well. During operation, the external force that is received by the support ring 5 varies with the rotational speed of the rotor 9. Therefore, when a position maintaining force cannot be adequately obtained at the partial braking position M, in a low speed range or a high speed range that is the prescribed rotational speed range of the rotor 9, the responsiveness of movement to the three positions decreases, and an impediment to the movement itself exists.

The difficulty in moving a single-row rotating-type eddy current braking apparatus versus a two-row apparatus is shown graphically in FIG. 39. More particularly, the required force F2 needed to rotate the support ring 5 and the stroke s of a cylinder for a single-row rotating-type eddy current braking apparatus is compared to a two-row rotating-type eddy current, wherein the same outer diameter and the same braking force are used.

The required force $F_2$ at the peak point A when moving from a non-braking state to a braking state is approximately 10–30 percent higher for a single-row rotating-type (shown by a dashed line) than for a two-row rotating-type (shown by a solid line) For this reason, when the two-row rotating-type eddy current braking apparatus actuator shown by FIGS. 37a and 37b is used for a single-row rotating-type eddy current braking apparatus, it is necessary to increase the diameter of piston 23 and stepped piston 22, and to increase the amount of air for operation. As a result, the actuator size is increased, and it is difficult to mount it on a large vehicle.

In light of the above, it is clear that single-row rotating-type eddy current braking apparatus offer benefits over two-row rotating-type eddy current braking apparatus in terms of fewer components, lower cost, less magnet rotational angle, etc. Another problem is that a single-row type eddy current braking apparatus requires much force to rotate the magnets. Other problems with the single-row types of braking apparatus include drag torque, low braking torque, difficulty in keeping magnets in place, high costs due to increased magnetic material when overcoming material expansion problems, the need to manufacture complex shapes when trying to reduce drag torque, the inability to use a small sized pneumatic cylinder, and the like. Consequently, there is still a need for improved eddy current braking apparatus, particularly single-row rotating-types.

SUMMARY OF THE INVENTION

In light of the existing needs for improved eddy current braking apparatus, it is a first object of the present invention is to provide an eddy current braking apparatus in which it is not necessary to increase the thickness of switching plates as the braking torque increases, in which there is as little loss as possible of braking force during a braking state, and in which leakage flux from between adjoining switching plates to the cylindrical portion of a rotor is suppressed during a non-braking state, whereby drag torque can be suppressed.

A further object of the present invention is to provide an eddy current braking apparatus which can satisfy the above objective and which can increase the efficiency of a magnetic circuit by minimizing the size $\epsilon 1$ of the gap between switching plates and permanent magnets, which can simplify the securing of permanent magnets to a support ring, can omit processing operations that need accuracy and the like.

It is also an object of the present invention to satisfy the above objects and to provide an eddy current braking apparatus which even if it employs a pneumatic cylinder of small size with low consumption of air, can generate a sufficiently large maximum force needed in the rotational speed range of the rotor, and which can achieve a high degree of cost decreases and size decreases for the apparatus as a whole.

Yet another object of the present invention is to satisfy the above objects and to provide an eddy current braking apparatus having a multi-position actuator which does not need an excessive amount of air, which can satisfactorily maintain a position at a partial braking position, and which has a small outer diameter so that it can be used in a single-row rotating-type eddy current braking apparatus.

Other objects and advantages of the present invention will become apparent as a description thereof proceeds.

In satisfaction of the foregoing objects and advantages, the present invention provides, in one embodiment, a single-row rotating-type eddy current braking apparatus equipped with a hollow cylindrical rotor mounted on a power transmission shaft, a ferromagnetic support ring which is disposed inside the rotor, and a plurality of permanent magnets which are installed on the outer peripheral surface of the support ring at constant intervals and which are arranged so that the orientations of the magnetic poles thereof alternate. A plurality of ferromagnetic switching plates are disposed between the plurality of permanent magnets and the rotor at approximately the same installation angles as the installation angles of the plurality of permanent magnets, and are spaced from the plurality of permanent magnets and the rotor. A cylindrical support body, which is made of a non-magnetic material supports the support ring and the plurality of switching plates. The plurality of permanent magnets and the plurality of switching plates are installed so as to be capable of rotating with respect to each other by a prescribed angle with respect to the rotational center of the power transmission shaft. The thickness of the switching plates is T, the width of the switching plates is W, the angle with respect to the center of the power transmission shaft between the same ends of two adjoining switching plates is Θ, and the angle with respect to the center of the power transmission shaft between two adjoining switching plates is δΘ. The dimensions and angles of the various components satisfy the relationship $0.75 \leq (\delta\Theta/\Theta) \times (W/T) > 1.5$ or 2.25, the value 1.5 or 2.25 dependent on the vehicle speed.

When the eddy current braking apparatus is used in a vehicle speed in which the final reduction ratio is at most 3.3, the relationship between the thickness T of the switching plates, the width W of the switching plates, the angle δΘ, and the angle Θ is preferably $0.75 \leq (\delta\Theta/\Theta) \times (W/T) \leq 2.25$. For a vehicle speed in which the final reduction ratio is greater than 3.3, the upper limit value is 1.5.

Furthermore, in an eddy current braking apparatus according to this invention, when the width of the permanent magnets is w, the relationship $0.7 \leq (W/w) \leq 1.5$ is satisfied.

In another embodiment, the single-row rotating-type eddy current braking apparatus is equipped with a hollow cylindrical rotor mounted on a power transmission shaft, and a ferromagnetic support ring disposed inside the rotor. The plurality of permanent magnets are installed on the outer peripheral surface of the support ring at constant intervals, and are arranged so that the orientations of the magnetic poles thereof alternate. A plurality of ferromagnetic switching plates are disposed between the plurality of permanent magnets and the rotor at approximately the same installation angles as the installation angles of the plurality of permanent magnets, and are spaced from the plurality of permanent magnets and the rotor. A cylindrical support body, which is made of a non-magnetic material, has an inner cylindrical portion, which is secured to and supports the support ring, and an outer cylindrical portion that is secured to and supports the plurality of switching plates. The inner and outer cylindrical portions form an annular space wherein the magnets and switching plates are disposed to achieve braking or non-braking states. The outer cylindrical portion with the switching plates can rotate by a prescribed angle with respect to the inner cylindrical portion about the rotational center of the power transmission shaft with the outer cylindrical portion being supported by the inner cylindrical portion or the support ring through a bearing.

In another embodiment of an eddy current braking apparatus according to this invention, the support body has an inner cylindrical portion, and an outer cylindrical portion that is secured to and supports the plurality of switching plates. A support ring that supports the permanent magnets is disposed between the inner and outer portions of the support body. The support ring can be rotated by a prescribed angle with respect to the rotational center of the power transmission shaft to effect braking.

As another feature of the invention, a seal member can be employed between the inner and outer cylindrical portions of the support body.

In another aspect of the invention, a bearing is preferably disposed between the support body and the outer surface of the support ring to support the support ring and allow for rotation of the support ring by a prescribed angle about the rotational center of the power transmission shaft.

In yet another aspect of the invention, the support ring is switched between a first state in which the permanent magnets coincide with the switching plates and a second state in which the permanent magnets are positioned between two adjoining switching plates. The support ring is driven in the same rotational direction as the rotor by at least one single-rod double-acting cylinder, and the single-rod double-acting cylinder is installed so that switching from the second state to the first state can be carried out by projection of a piston rod. The plurality of switching plates can also be driven in the opposite rotational direction to achieve the same effect as when the support ring is rotated.

In another form of an eddy current braking apparatus according to the present invention, an overlapping state of the permanent magnets and the switching plates can be switched between a plurality of states by driving the support ring or the plurality of switching plates in a rotational direction by a two-stage actuator assembly. The assembly includes a first actuator having a cylinder with a piston slidably disposed therein, and a piston rod extending from the piston. A second actuator having a cylinder in which the cylinder of the first actuator is slidably disposed so as to function as a piston for the second actuator, the piston rod of the first actuator extending from the cylinder of the second actuator and acting as a piston rod for both actuators. A spring may be disposed between the cylinders of the first actuator and the second actuator and on the piston rod side of a pressure receiving chamber, or the first actuator may be constituted by a plurality of actuators disposed in series.

A spring may be disposed between the cylinders of the first actuator and the second actuator and in the pressure receiving chamber on the piston rod side of at least one of the plurality of actuators.

In another form of an eddy current braking apparatus according to the present invention, an overlapping state of the permanent magnets and the switching plates can be switched between a plurality of states by driving the support ring or the plurality of switching plates in a rotational direction by an actuator having two free pistons slidably fitting around a piston rod having a first end within a cylinder and a second end projecting from the cylinder. A stopper is provided on the midportion of the inner peripheral surface of the cylinder and on the midportion of the piston rod between the free pistons. In this case, a spring may be disposed between the free piston and the stopper provided on the piston rod.

The invention is also an improvement in a method of producing a braking torque in a single row rotating type eddy current braking apparatus wherein a plurality of magnets and switching plates, each radially spaced from a rotational center of a powered shaft and spaced from each other, are aligned with each other to create a magnetic circuit and to impose a braking torque on a rotor surrounding the magnets and switching plates. The improvement comprises rotating the magnets to create the magnetic circuit in a direction of rotation coincident with a rotational direction of the powered shaft, or alternatively, rotating the switching plates in a direction opposite to the rotation of the powered shaft.

In the mode wherein the switching plates rotate, the switching plates and magnets are configured with one or more bearings disposed between one or more faces of a rotatable member supporting the switching plates and one or more opposing faces of a support ring supporting the magnets or a fixed member supporting the support ring. Alternatively and in a mode wherein the magnets rotate, the bearings are disposed between one or more faces of a rotatable member supporting the magnets and one or more opposing faces of a fixed member supporting the switching plates.

A seal can be provided between the switching plate rotatable member and the magnet fixed member, and rotating either the switching plates or the magnets can be accomplished using a single rod double acting cylinder linked to the appropriate rotatable member.

The switching plates or the magnets are rotated in the opposite or same rotational direction of the rotor, respectively, to achieve alignment and produce the braking state. That which is rotated can be then rotated in the opposite direction wherein the magnets and switching plates are misaligned to disrupt the magnetic circuit and create a non-braking state. A partial braking state can be achieved by the rotation the either the switching plates or magnets to a position wherein the magnets and switching plates are partially aligned with respect to each other to form a partial braking state, one that is between the braking state and the non-braking state.

The inventive method also entails controlling the dimensions and angular relationship of the magnets and switching plates to satisfy the relationship noted above.

BRIEF DESCRIPTION OF THE DRAWINGS

Reference is now made to the drawings of the invention.

FIG. 5 is a cross-sectional view showing the structure of a second embodiment of an eddy current braking apparatus in a region corresponding to region H of FIG. 4.

FIG. 6 is a cross-sectional view showing a variation of the second embodiment of an eddy current braking apparatus.

FIG. 7 is a cross-sectional view showing the structure of a third embodiment of an eddy current braking apparatus in a region corresponding to region H of FIG. 4.

FIG. 8 is a cross-sectional view showing a variation of the third embodiment of an eddy current braking apparatus.

FIG. 16 schematically illustrates the eddy current braking apparatus of FIG. 14 in a braking state.

FIG. 17a is a longitudinal cross-sectional view of a first actuator used in a variation of the eddy current braking apparatus of FIG. 14 in a non-braking state, FIG. 17b shows the actuator in a partial braking state, and FIG. 17c shows the actuator in a braking state.

DESCRIPTION OF THE PREFERRED EMBODIMENTS

Figure 1:
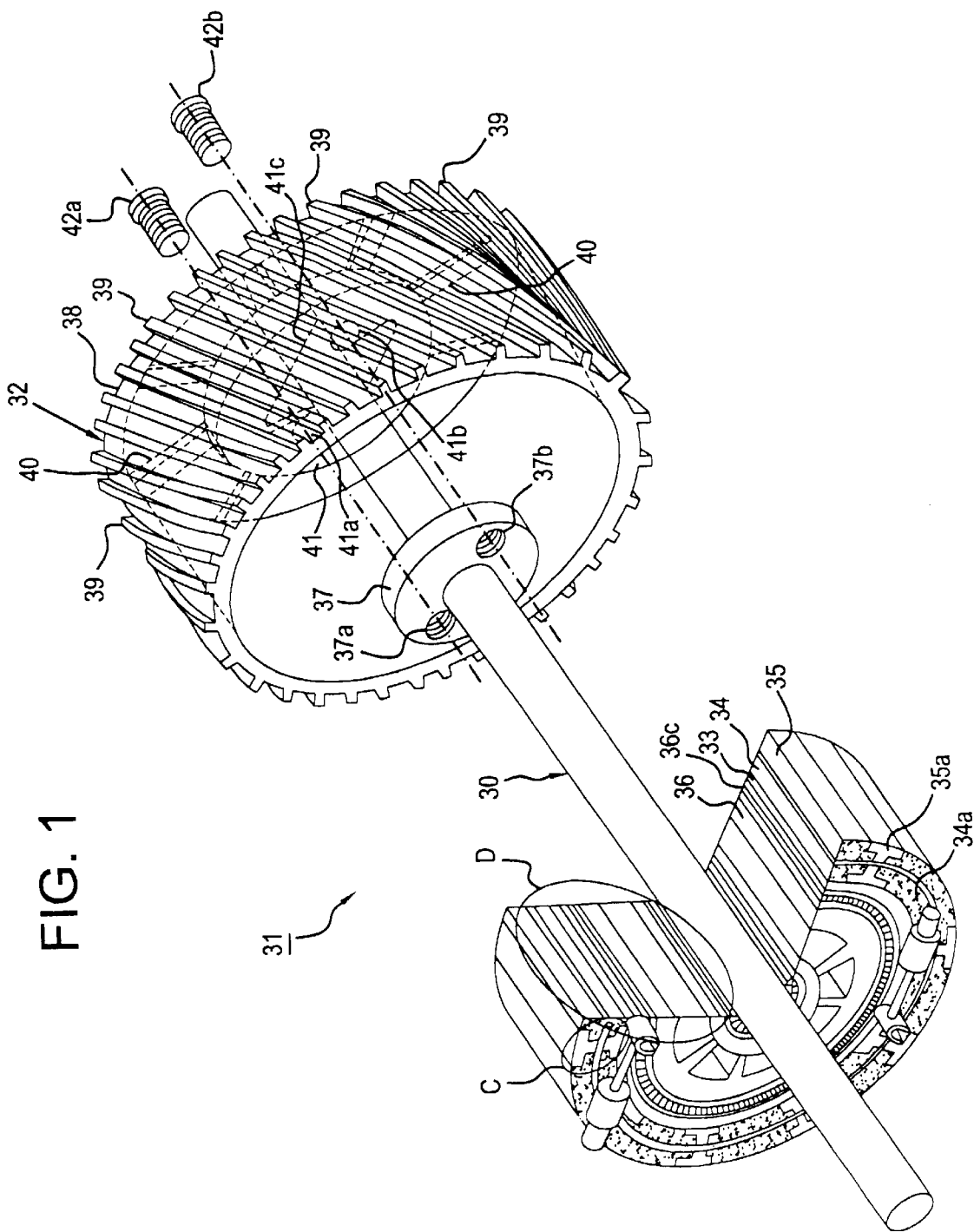
FIG. 1 is a cutaway, simplified perspective view of a first embodiment of an eddy current braking apparatus as mounted on a propeller shaft.

Below, a number of embodiments of an eddy current braking apparatus according to the present invention will be described while referring to the accompanying drawings. In the following description, an example will be given in which an eddy current braking apparatus according to the present invention is mounted as an auxiliary braking apparatus on the midportion of a power transmission shaft in the form of a propeller shaft of a large bus. However, the use of the inventive apparatus is not limited to bus applications or propeller shafts, but may be employed on other large vehicles, e.g., trucks or the like, or other powered shafts requiring braking, whether on a vehicle or not.

As shown in FIGS. 1–4, one embodiment of an eddy current braking apparatus is identified by the reference numeral 31 and is equipped with a rotor 32, a support ring 33, permanent magnets 34, switching plates 35, and a support body 36.

Figure 4:
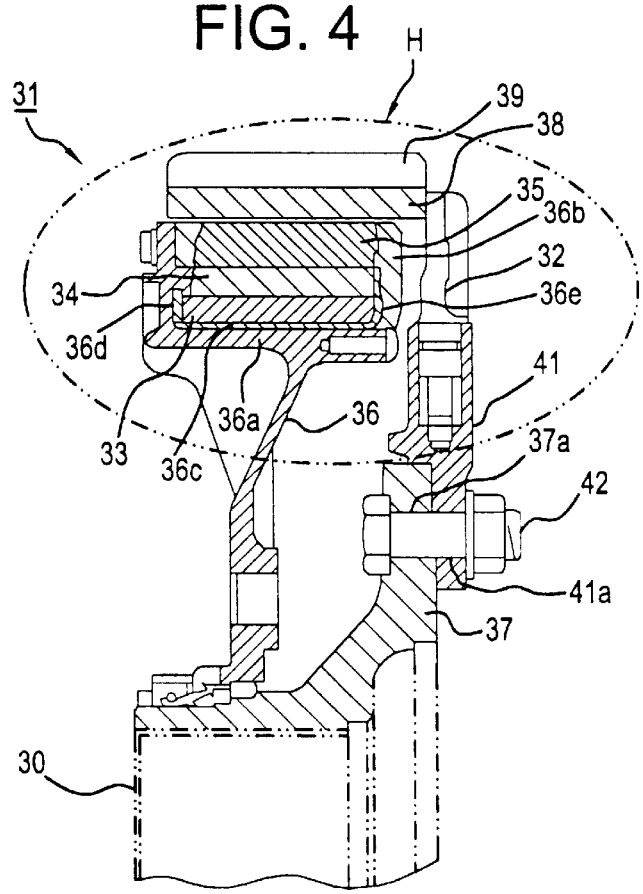
FIG. 4 is a longitudinal cross-sectional view of region D of FIG. 1.

FIGS. 1 and 4 depict a first rotor retaining plate 37 that is secured by suitable means to a prescribed location on a propeller shaft 30, which is a power transmission shaft of a large bus. The first rotor retaining plate 37 has two screw holes 37a and 37b, each screw hole extending through the plate 37 in its thickness direction.

The rotor 32 has a hollow cylindrical body 38 and a large number of cooling fins 39 that project from the outer peripheral surface of the body 38. A plurality (eight (8) in the illustrated example) of radially extending installation plates 40 are secured to one end surface of the body 38 by suitable means. A second rotor retaining plate 41 is secured at the center of the body 38 by the eight installation plates 40.

Through holes 41a and 41b are formed in the second rotor retaining plate 41 in positions corresponding to the positions of the screw holes 37a and 37b in the rotor retaining plate 37. In addition, at the center of the second rotor retaining plate 41, a through hole 41c is formed through which the propeller shaft 30 can pass without contact.

The rotor 32 is secured to the propeller shaft 30 by aligning the screw holes 37a and 37b formed in the rotor retaining plate 37 with the through holes 41a and 41b formed in the second rotor retaining plate 41, by passing bolts 42a and 42b through the through holes 41a and 41b, and then screwing them into the screw holes 37a and 37b.

Other features of the rotor 32 of this embodiment are considered conventional in structure, and a further description is not deemed necessary for understanding of the invention.

The support ring 33 is disposed inside the rotor 32 with the support ring 33 being made of steel, which is a ferromagnetic material. As shown in FIG. 4, the support ring 33 is supported by the support body 36 for rotation by a prescribed angle about the rotational center of the power transmission shaft 30.

A plurality of the permanent magnets 34 (16 magnets in this embodiment) are lined up in the circumferential direction on the outer peripheral surface of the steel support ring 33 and are secured by a suitable means. The plurality of permanent magnets 34 are arranged at constant intervals in the circumferential direction of the support ring 33, and adjoining magnets have an opposite orientation of their poles from each other. A nonmagnetic restraining material 34a is disposed between adjoining permanent magnets 34.

A plurality of steel switching plates 35, which a ferromagnetic material, are disposed between the outer peripheral surface formed by the plurality of permanent magnets 34 and the inner peripheral surface of the rotor 32.

Figure 2:
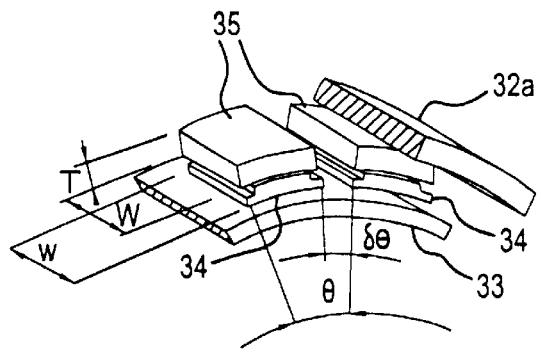
FIG. 2 is an enlarged perspective view of region C in FIG. 1 in a braking state.
Figure 3:
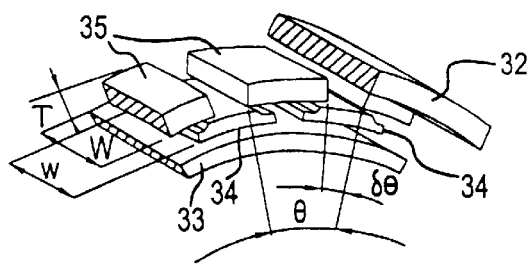
FIG. 3 is an enlarged perspective view of region C in FIG. 1 in a non-braking state.

As depicted in FIGS. 1–3, the plurality of switching plates 35 are arranged so as to be at approximately the same installation angles as the plurality of permanent magnets 34. In addition, the plurality of switching plates 35 are spaced from the plurality of permanent magnets 34 and the rotor 32. A nonmagnetic restraining member 35a is disposed between adjoining switching plates 35.

The support ring 33 and the plurality of switching plates 35 are supported by the support body 36, which is made from a nonmagnetic material. The support body 36 is required to be light weight. to be non-magnetic, and to have heat radiating properties. In view of these needs, the body 36 is preferably made from an aluminum alloy casting.

In FIG. 1, the structure of the support body 36 has been simplified to avoid complexity, but as shown in FIG. 4, it has a support ring mounting portion 36a for supporting the support ring 33 through a bearing 36c. A switching plate mounting portion 36b which has an L-shaped cross section, and which is secured to the support ring mounting portion 36a, supports the plurality of switching plates 35. Bearings 36d and 36e mounted between the support body 36 and the support ring 33 rotatably support the support ring 33 with respect to the support body 36.

For clarity purposes in FIG. 1, the structure in the vicinity of the support ring mounting portion 36a and the switching plate mounting portion 36b has been simplified. In addition, in FIG. 1, bearing 36c is shown enlarged, and bearings 36d and 36e have been omitted.

In the FIG. 1 embodiment, the support body 36 is constructed to support both the support ring 33 and the plurality of switching plates 35.

FIGS. 2 and 3 depict dimensional and angular relationships of certain components of the apparatus 31. The thickness of the switching plates 35 is T, the width of the switching plates 35 is W, the angle between the opposing end portions of two adjoining switching plates 35, 35 measured from the center of the power transmission shaft 30 is $\delta\Theta$, and the angle between two adjoining switching plates 35,35 measured from the center of the power transmission shaft 30 is $\Theta$, i.e., as measured from the same face of each plate. Using these dimensions and angles, the relationship $0.75 \leq (\delta\Theta/\Theta) \times (W/T) \leq 1.5$ or 2.25 should be satisfied, depending on vehicle speed as noted below. In the following explanation, $(\delta\Theta/\Theta) \times (W/T)$ will be referred to as the magnetic leakage coefficient G.

As discovered by the present inventors, in an eddy current braking apparatus 31, braking torque and the drag torque are affected by the relationship $(\delta\Theta/T)$ between the thickness T of the switching plates 35 and the separation $\delta\Theta$ on the inner peripheral surface between adjoining switching plates 35 in the circumferential direction, and the width W of the switching plates.

Vehicle speed is also a factor for these eddy current braking apparatus, particularly when considering drag torque as a result of flux leakage. Recently, eddy current braking apparatus 31 have come to be applied to the drive systems of vehicles for low and medium speed operation as well as to vehicles having a drive system such as a direct drive system. In the low/medium speed or direct drive vehicles, the allowable amount of magnetic leakage during a non-braking state is different from that in vehicles operating at high speeds or in vehicles having an overdrive type of drive system in which eddy current braking apparatus have been employed in the past.

This embodiment of an eddy current braking apparatus 31 is based on the results of various research and experiments on the effects of the relationship ($\delta\Theta/T$) between the thickness T of the switching plates 35 and the separation $\delta\Theta$ in the circumferential direction between adjoining switching plates 35 on the inner peripheral surface thereof and the width W of switching plates. The research and experiments were performed with respect to eddy current braking apparatus for high speed vehicles and eddy current braking apparatus for low and medium speed vehicles. In the present invention, a high speed vehicle means, in the case of a large truck, for example, one in which the final reduction ratio is greater than 3.3, and a low or medium speed vehicle means, for example, a large truck in which the final reduction ratio is at most 3.3.

Through the research noted above, in an eddy current braking apparatus 31 for a high speed vehicle, the inventors have discovered that the magnetic leakage coefficient G is preferably at least 0.75 and at most 1.5, and in an eddy current braking apparatus 31 for a low or medium speed vehicle, the magnetic leakage coefficient G is preferably at least 0.75 and at most 2.25.

In the eddy current braking apparatus 31, the interval between adjoining switching plates 35, 35 in the circumferential direction on the inner peripheral side thereof is expressed as the ratio ($\delta\Theta/\Theta$) of the angle $\delta\Theta$ between end portions on the inner peripheral surface side of adjoining switching plates 35 in the circumferential direction measured from the center of the power transmission shaft 30, and the angle $\Theta$ between permanent magnets 34 measured from the rotational center so that an optimal value can be obtained regardless of the size of the diameter of the support ring 33.

In order to achieve a sufficient braking torque, the magnetic leakage coefficient G is made at least 0.75 for either a high speed vehicle or a low or medium speed vehicle. If the magnetic leakage coefficient G is less than 0.75 in a braking state, a sufficient braking torque is not obtained.

The upper limit of the relationship relates to an increase in the magnetic leakage and unacceptable drag torque. For high speed vehicle applications, the magnetic leakage coefficient G is made at most 1.5 for an eddy current braking apparatus 31. For a low or medium speed vehicle, the magnetic leakage coefficient G is made at most 2.25 for an eddy current braking apparatus 31. If the magnetic leakage coefficient G exceeds these values, the magnetic leakage increases during a non-braking state and the drag torque becomes high, thereby incurring the possibility of an adverse effect on the fuel consumption of the vehicles, regardless of speed.

Furthermore, it has been discovered that drag torque and decreases in drive torque can both be restricted to a minimum value if the relationship $0.7 \leq (W/w) \leq 1.5$ is followed, wherein w is the width of the permanent magnets 34, and W is the width of the switching plates. That is, the ratio (W/w) of the width W of the switching plates 35 to the width w of the permanent magnets 34 should be at least 0.7 and at most 1.5 to lessen drag torque and loss of drive torque to minimum values.

The manner in which the apparatus of FIGS. 1–4 operates will now be described. Referring to FIG. 2, a so-called braking state occurs when the switching plates 35 and the permanent magnets 34 completely overlap, and a magnetic circuit is formed by the support ring 33, adjoining permanent magnets 34, adjoining switching plates 35, and the cylindrical portion 32a of the rotor 32. In other words, a braking torque is produced when the cylindrical portion 32a of the rotating rotor 32 cuts the magnetic field from the permanent magnets 34. During this braking state, the magnetic leakage coefficient G is at least 0.75, so an adequate braking torque can be obtained.

By rotating the support ring 33 from the braking state shown in FIG. 2, to that shown in FIG. 3, the permanent magnet 34, (being rotated by just half a pitch of the magnet) straddles adjoining switching plates 35 and overlaps half of each one. As a result, a short circuited magnetic circuit of the support ring 33, adjoining permanent magnets 34, and switching plates 35 is formed, and a so-called non-braking state is achieved. In this state, almost no magnetic field acts on the cylindrical portion 32a of the rotor 32, so the braking force is extremely small.

As noted above, by controlling the magnetic leakage coefficient G for an eddy current braking apparatus to be between 0.75–1.5 for a high speed vehicle and between 0.75–2.25 for a low or medium speed vehicle, the magnetic leakage to the cylindrical portion 32a of the rotor 32 during a non-braking state is decreased. Accordingly, the braking torque acting on the cylindrical portion 32a of the rotor 32 is greatly decreased, and drag torque is decreased.

Furthermore, the ratio (W/w) of the width W of the switching plates 35 to the width w of the permanent magnets 34 is set to an appropriate value of at least 0.7 and at most 1.5. As a result, drag torque during a non-braking state is also suppressed. In addition, lessening of the braking torque during a braking state is avoided, and a high efficiency design is possible.

In this manner, by limiting the magnetic leakage coefficient G to an appropriate range, several advantages are attained over prior art apparatus. It is not necessary to increase the thickness of the switching plates 35 as the braking torque increases. The braking force is reduced as little as possible during a braking state. Flux leaking to the cylindrical portion 32a of the rotor 32 between adjoining switching plates 35, 35 during a non-braking state and drag torque can be suppressed.

Next, a second embodiment of the invention will be described. In the following descriptions of each embodiment, portions, which differ from those in the above-described first embodiment will be described, and portions having the same structure will have the same reference numeral, and a repeated description thereof will be omitted.

Referring now to FIG. 5, an eddy current braking apparatus designated by the reference numeral 31-1 is equipped with a rotor 32 mounted on a power transmission shaft (not shown), a support ring 33 disposed on the interior of the rotor 32, and a plurality of permanent magnets 34 disposed on the outer peripheral surface of the support ring 33 at constant intervals with the directions of the magnetic poles thereof alternating. A plurality of switching plates 35 (made from a ferromagnetic material) are disposed between and separated from the plurality of permanent magnets 34 and the rotor 32 at approximately the same installation angles as the installation angles of the plurality of permanent magnets 34. A support body 36 made of a non-magnetic material supports the support ring 33 and the plurality of switching plates 35.

The support body 36 is equipped with an inner cylindrical portion 43a, which is integrally secured to the support ring 33 such as by being cast around it, and an outer cylindrical portion 43b, which supports the plurality of switching plates 35. A drive portion 47 is connected to the outer cylindrical portion 43b, and the outer cylindrical portion 43b can be rotated by the drive portion 47 with respect to the inner cylindrical portion 43a by a prescribed angle about the rotational center of the power transmission shaft.

In order to make the outer cylindrical portion 43b rotatable with respect to the inner cylindrical portion 43a, bearings 45 and 46 are disposed in a position where the inner cylindrical portion 43a and the outer cylindrical portion 43b oppose each other. However, the invention is not restricted to this form, and as shown in FIG. 6, the support ring 33 can be made to oppose the outer cylindrical portion 43b, and the bearings 45 and 46 may be disposed in the location where the support ring 33 and the outer cylindrical portion 43b oppose each other.

Still referring to FIGS. 5 and 6, reference number 48 indicates a seal material which is disposed between the inner cylindrical portion 43a and the outer cylindrical portion 43b of the support body 36 for preventing foreign materials and water and the like from entering into the support body 36. The seal material 48 has a structure so as to be able to withstand rotation of the outer cylindrical portion 43b with respect to the inner cylindrical portion 43a.

In the eddy current braking apparatuses 31-1 and 31-2, the plurality of switching plates 35 and the permanent magnets 34 are aligned with each other by rotation of the outer cylindrical portion 43b via by the drive portion 47. When this alignment takes place, a magnetic circuit is formed by the support ring 33, adjoining permanent magnets 34, adjoining switching plates 35, 35, and the cylindrical portion 32a of the rotor 32, and a so-called braking state occurs. As a result, when the rotating cylindrical portion 32a cuts the magnetic field from the permanent magnets 34, due to the effect of the eddy currents produced in the cylindrical portion 32a and the magnetic field, a braking torque is generated in the cylindrical portion 32a.

From the braking state, the outer cylindrical portion 43b including the plurality of switching plates 35 is rotated by just half a pitch. In this state, one permanent magnet straddles adjoining switching plates 35, 35 and overlaps half of each one, and a non-braking state takes place. As a result, a short circuited magnetic circuit is formed by the support ring 33, and adjoining permanent magnets 34 and switching plates 35, and a so-called non-braking state occurs.

The switching between a braking state and a non-braking state of the embodiment of an eddy current braking apparatus 31-1 and 31-2 wherein the plates 35 rotate contrasts with the eddy current braking apparatus 31 in which support ring 33 and magnets 34 rotate by a prescribed angle. In the braking apparatus 31-1 and 31-2, the size $\epsilon 1$ of the gap between the permanent magnets 34 and the switching plates 35 and the size $\epsilon 2$ of the gap between the support body 36 and the bearing 45 have almost the same shape and changes in dimensions in response to temperature variations. Therefore, according to this embodiment, when setting the size $\epsilon 1$ of the gap between the permanent magnets 34 and the switching plates 35, it becomes unnecessary to take into consideration the size $\epsilon 2$ of the gap between the support body 36 and the bearing 45. Accordingly, it is not necessary to make the size $\epsilon 1$ of the gap larger than necessary (as in the prior art discussed above), and it can be made the smallest size necessary, thereby increasing the efficiency of the magnetic circuit.

The eddy current braking apparatus 31-1 and 31-2 allow the permanent magnets 34 to be secured on the non-moving support ring 33. Therefore, compared to a conventional structure in which the support ring 33 is rotated by a prescribed angle at a high speed, securing the permanent magnets 34 to the support ring 33 can be carried out in a simpler fashion.

In the eddy current braking apparatus 31-1 and 31-2, it is possible to make the support ring 33 and the support body 36 integral with each other such as by casting one around the other, so additional processing for increasing accuracy and the like can be omitted.

The eddy current braking apparatus 31-1 and 31-2 also eases the ability to seal against entry of unwanted material into the spaces between the magnets 34 and plates 35. By rotating the outer cylindrical portion 43b with respect to the inner cylindrical portion 43a of the support body 36, the drive portion 47 can be installed on the outer side of the support body 36. This arrangement also allows for structure, e.g., seals 48, to be easily installed for preventing the entry of water or foreign material into the permanent magnets 34.

Although not shown, the permanent magnets 34 can have pole pieces about their outer periphery in the apparatus 31-1, and 31-2. Further, these pole pieces can be utilized on the later described embodiments of FIGS. 7 and 8 as well.

Referring now to FIG. 7, an eddy current braking apparatus designated as 31-3 is equipped with a rotor 32 which is mounted on a power transmission shaft (not shown), a support ring 33 which is disposed on the interior of the rotor 32, and a plurality of permanent magnets 34 which are installed on the outer peripheral surface of the support ring 33 with a constant spacing and with the directions of the magnetic poles thereof alternating. The apparatus 31-3 also includes a plurality of switching plates 35 (made of a ferromagnetic material) which are installed between and separated from the plurality of permanent magnets 34 and the rotor 32, and which have approximately the same installation angles as the plurality of permanent magnets 34. A support body 36 of a non-magnetic material supports the support ring 33 and the plurality of switching plates 35.

The support ring 33 projects beyond both sides of the permanent magnets 34. The support body 36 projects opposite the outer periphery of the projecting portions 33a, and a bearing 50 such as a sliding bearing is disposed between the outer peripheral portion of both projecting portions 33a and the projecting portions 36a of the support body 36. As a result, the support ring 33 is supported by the bearing 50 so as to be able to rotate by a prescribed angle.

Reference number 51 shows another bearing which is disposed the support ring 33 and the support body 36, and which rotatably supports the support ring 33.

As shown in FIG. 7, the left and right projecting portions 33a, 33a may have the same shape, or they may have a different shape as shown in FIG. 8. In particular, if they have a different shape on the left and right as shown in FIG. 8, the weight of the support ring 33 can be decreased, so the overall weight can be decreased.

The apparatus of FIGS. 7 and 8 functions in the same manner as FIGS. 5 and 6 in terms of aligning the magnets 34 and the plates 35 for the braking state, and displacing the magnets 34 and plates 35 for the non-braking state. The apparatus 31-3 and 31-4 differs from apparatus 31-1 and 31-2 in that the support ring of FIGS. 7 and 8 rotates whereas the portion 43b of FIGS. 5 and 6 rotates.

However, the FIG. 7 and 8 apparatus still maintains the same benefits as the FIG. 5 and 6 embodiments in terms of the response to thermal expansion. In the apparatus 31-3 and 31-4, the size $\epsilon 1$ of the gap between the permanent magnets 34 and the switching plates 35 and the size ε2 of the gap between the support body 36 and the bearing 50 maintain substantially the same shape and the same dimensional changes in response to temperature changes. Therefore, when setting the size ε1 of the gap between the permanent magnets 34 and the switching plates 35, it is not necessary to take into consideration the size ε2 of the gap between the support body 36 and the bearing 50. Accordingly, it is not necessary to make the size ε1 of the gap larger than necessary, and it can be made the smallest necessary size, and the efficiency of the magnetic circuit can be increased.

In the eddy current braking apparatus 31-3 and 31-4, the steel support ring 33 slides with respect to the bearing 50. In this way, the steel support ring 33 can adequately perform it function with an inexpensive surface treatment, and the support ring 33 can be easily processed or machined with high accuracy.

Figure 9:
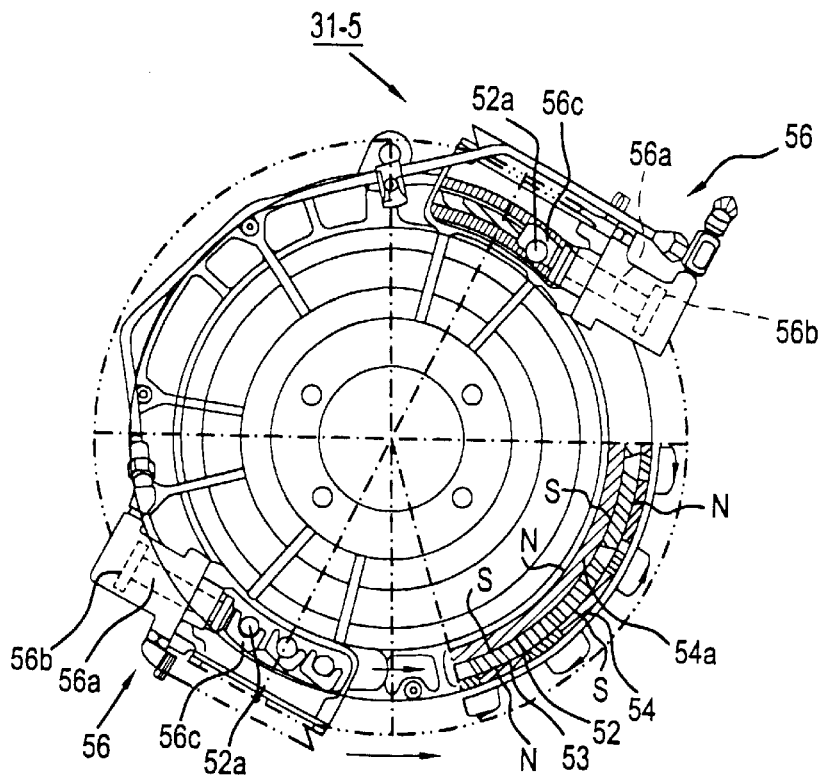
FIG. 9 is a cutaway schematic side elevation of the structure of a fourth embodiment of an eddy current braking apparatus.
Figure 10:
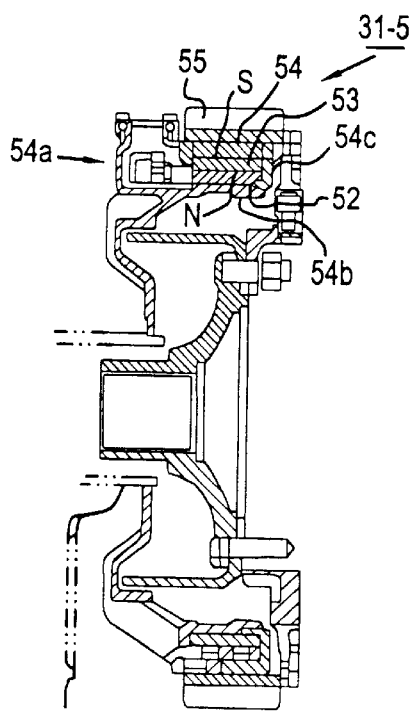
FIG. 10 is a longitudinal cross-sectional view of the fourth embodiment of an eddy current braking apparatus.
Figure 11A:
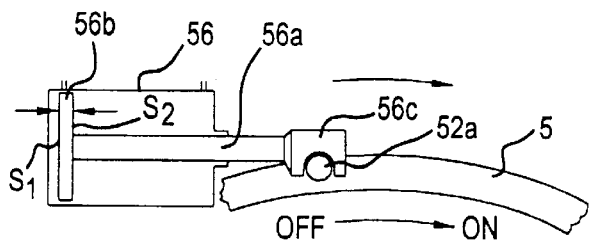
FIG. 11 shows the periphery of a pneumatic cylinder of the fourth embodiment of an eddy current braking apparatus.
Figure 11B:
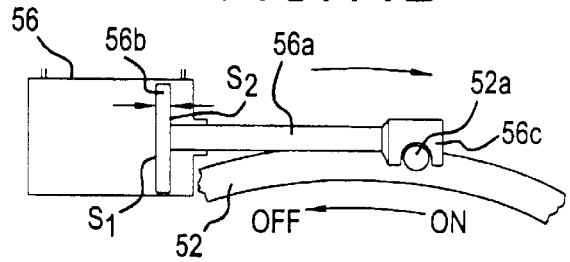

FIGS. 9–11 schematically another embodiment of an eddy current braking apparatus 31-5 having a row of support rings 52, which serve as yokes. A plurality of permanent magnets 53 are installed on the outer peripheral surface of the row of support rings 52 which are constructed so as to be rotatable and to serve as a yoke with a prescribed spacing in the circumferential direction and with the north poles and south poles alternating.

A plurality of switching plates 54 are provided and disposed with a prescribed spacing in the circumferential direction. The circumferential spacing of the switching plates 54 is achieved by having the plates 54 supported by a support body 54a. The support body 54a has a portion 54b disposed between the support ring and the powered shaft, and another portion 54c which is positioned adjacent the magnet 53 and support ring 52 in a direction parallel to the axis of rotation of the powered shaft. The portion 54a supports the switching plates for both the circumferential spacing, as well as a radial spacing with respect to the magnets 53 and a rotor 55. The rotor 55 is provided adjacent the outer periphery of the switching plates 54 with a prescribed spacing in the radial direction from the switching plates 54. In other words, each of the magnets 53, the switching plates 54 and the rotor 55 are radially spaced from an axis of rotation of the powered shaft, with each of the switching plates 54 being radially spaced between an inner surface of the rotor and an outer circumference formed by the spaced apart outer surfaces of the magnets 53.

The support ring 52 is rotated to a position in which the permanent magnets 53 on the support ring are aligned with the switching plates 54. In this state, a magnetic circuit is formed between adjoining permanent magnets 53 in the circumferential direction including the switching plates 54 and the inner peripheral surface of the cylindrical portion of the rotor 55 as shown by the dashed arrows in FIG. 9, and a braking state takes place. As a result, a braking torque is generated by the eddy currents produced in the inner peripheral surface of the cylindrical portion of the rotor 55.

From the position corresponding to this braking state, the support ring 52 is rotated and each permanent magnet 53 straddles half of adjoining switching plates 54. In this state, a magnetic circuit is formed between adjoining permanent magnets 53 through the switching plates 54, so flux from the permanent magnets 53 no longer acts on the rotor 55. As a result, eddy currents no longer flow in the inner peripheral surface of the cylindrical portion of the rotor 55, and a braking torque is no longer generated.

FIG. 9 also depicts a pair of a diametrically opposed pneumatic cylinders for rotating the support ring 52. Each pneumatic cylinder 56 is installed such that when air is supplied to the surface of the piston 56b having a larger pressure receiving area S1 (the opposite side from which the piston rod 56a projects as shown in FIG. 11a), the drive member or piston rod 56a will move in a direction causing the support ring 52 to rotate in the same rotational direction (shown by the solid arrow in FIG. 9) as the rotational direction of the rotor 55 (shown by the long and short dashed arrow in FIG. 9). This rotation results in a switch from a non-braking state to a braking state. The piston rod 56a of each pneumatic cylinder 56 has a connecting portion 56c formed at its end that engages with a connecting projection 52a formed on the side portion of the support ring 52.

Referring to FIG. 11, in pneumatic cylinder 56, when the same air pressure is supplied to both sides of the cylinder, the force acting on the piston 56b on the side having the larger pressure receiving area (the side having the pressure receiving area S1) is greater than the force acting on the side having the smaller pressure receiving area (the side having the pressure receiving area S2).

Figure 12:
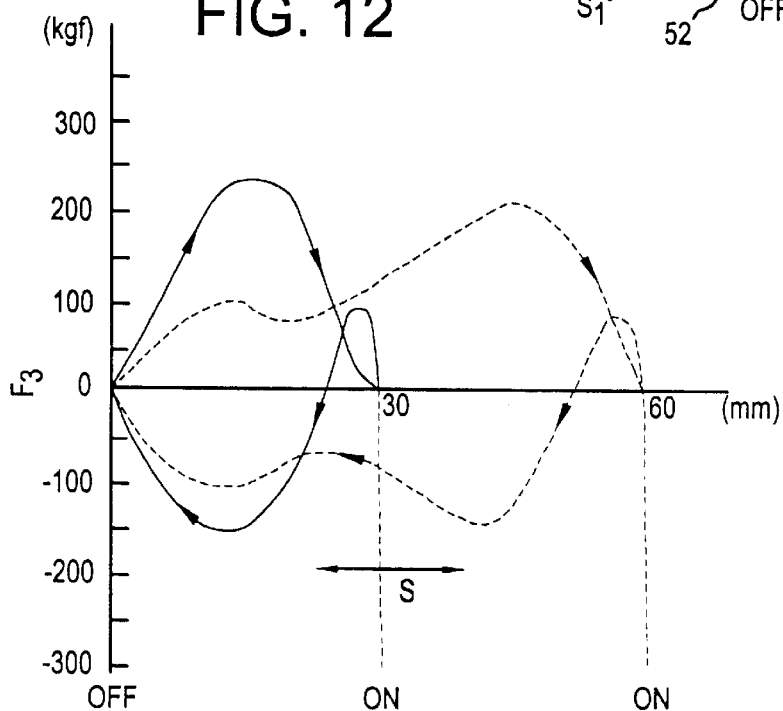
FIG. 12 is a graph illustrating the effects of the present invention.

Moving the support ring between the braking and non-braking states can be described in terms of the cylinder stroke s and the cylinder force F3 necessary to rotate a support ring of a single-row rotating-type or a two-row rotating-type eddy current braking apparatus. FIG. 12 depicts such a relationship wherein switching from a non-braking state to a braking state to a non-braking state is shown by a solid line (single row) or the dashed line (two-row).

When switching from a non-braking state (a second state) to a braking state (a first state), a higher cylinder force F3 is necessary than when switching from a braking state to a non-braking state. Therefore, a pneumatic cylinder for driving the support ring 52 of an eddy current braking apparatus must be selected based on the maximum required cylinder force when switching from a non-braking state to a braking state.

When rotating the support ring 52 in the rotational direction of the rotor 55 in order to switch from a non-braking state (second state) to a braking state (first state), the force which is generated by the pneumatic cylinder 56 can be reduced by the following effect.

Namely, the flux that passes through the inner portion of the rotor 55 is dragged in the rotational direction of the rotor 55. Therefore, the flow of flux that passes through the interior of the switching plates 54 is unavoidably sloped in the rotational direction of the rotor 55. Then, the reaction due to the action whereby the flux passing through the interior of the switching plates 54 is always in a stable state, i.e., it passes through the switching plates 54 and along the shortest path extending to the permanent magnets 53 installed on the support ring 52.

Figure 13A:
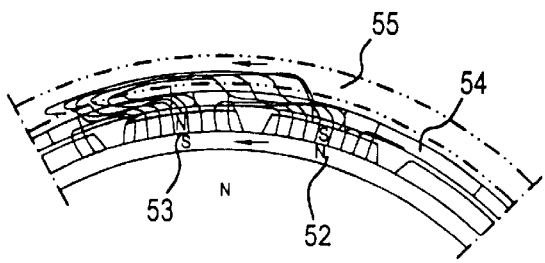
FIGS. 13a and 13b schematically illustrate the effects of the present invention.

Referring to FIG. 13a, when the permanent magnets 53 are rotated in the same direction as the rotor 55 and switching takes place from a non-braking state (second state) to a braking state (first state), the direction of movement of the permanent magnets 53 and the direction of the magnetic action which acts to counteract the sloping of the flux are the same. Therefore, a reaction or magnetic attractive force assists in magnet rotation.

Figure 13B:
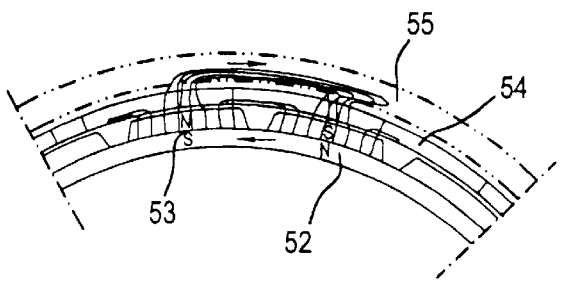

In contrast and as shown in FIG. 13b, when the permanent magnets 53 are rotated in the opposite direction from the rotor 55 to switch from a non-braking state (a second state) to a braking state (first state), the direction of movement of the permanent magnets 53 and the direction of the magnetic action that tries to cancel the sloping of the flux are opposite to each other. As a result, a reaction force that tends to impede the movement of the permanent magnets 53 acts on the permanent magnets 53, and by that amount an additional force is necessary in order to move the permanent magnets 53.

Based on that shown in FIGS. 13*a* and 13*b*, the pneumatic cylinders 56 of FIG. 9 are disposed so that the rotation of the support ring 52 follows the rotation of the rotor to minimize the force necessary to go between the braking and non-braking states. That is, the rotation of the support ring 52 in a single-row 20 rotating-type apparatus when switching from a non-braking state (second state) to a braking state (first state) is carried out by supplying air to the side of the piston having the larger pressure receiving area S1 to project the piston rod 56*a* in the rotational direction of the rotor 55.

In this embodiment, the large force needed to effect rotation is not generated solely by the pneumatic cylinder. Instead, by specifying the installation position of the pneumatic cylinder 56, the properties of the eddy current braking apparatus can be utilized, and the load applied to the pneumatic cylinder 56 can be decreased as much as possible. Therefore, the pneumatic cylinder 56 can produce the same action, i.e., switching from a non-braking state to a braking state, with a smaller force than in the past.

In addition, since the rotative action can be realized with a smaller force, a pneumatic cylinder with a smaller size and lower consumption of air can be employed while still generating the maximum force needed within the rotational speed range of the rotor 55. Thus, decreases in cost and size of the apparatus as a whole can be achieved.

Further yet, because of the reduced force requirement, a single-row rotating-type eddy current braking apparatus, e.g., apparatus 31-5, can be used instead of a two-row rotating-type eddy current braking apparatus. Consequently, gains are realized by a reduced number of parts, and a smaller stroke s of the cylinder, thereby decreasing the size, the cost, and the power requirements of the pneumatic cylinder.

The operation of the apparatus 31-5 is similar to the operation of the inventive apparatus described above in terms of switching from a non-braking state to a braking state. More specifically, air is supplied to the side of the piston 56*b* of the pneumatic cylinder 56 having the larger pressure receiving area (S1), and the piston rod 56*a* is projected in the direction of the solid arrow and the long and short dashed line arrow to rotate the support ring 52 so as to align the magnets 53 with the switching plates 54. With this alignment, a magnetic circuit shown by the dashed line in FIG. 13 is formed including the switching plate 54 and the inner peripheral surface of the cylindrical portion of the rotor 55, and a braking state takes place. As a result, a braking torque is generated as a result of the eddy currents produced in the inner peripheral surface of the cylindrical portion of the rotor 55.

To switch from the braking state to the non-braking state, the support ring 52 is rotated in reverse from the braking state so that a permanent magnet 53 straddles two adjoining switching plates 54 and overlaps half of each. As a result, a magnetic circuit is formed between adjoining permanent magnets 53,53 including the switching plate 54, and a magnetic flux from the permanent magnets 53 no longer acts on the rotor 55. As a result, eddy currents no longer flow in the inner peripheral surface of the cylindrical portion of the rotor 55, and a braking torque is no longer generated.

FIGS. 14–25 are directed to further embodiments of the invention relating to the configuration of the pneumatic cylinder employed for rotation and control between braking and non-braking states.

Figure 14:
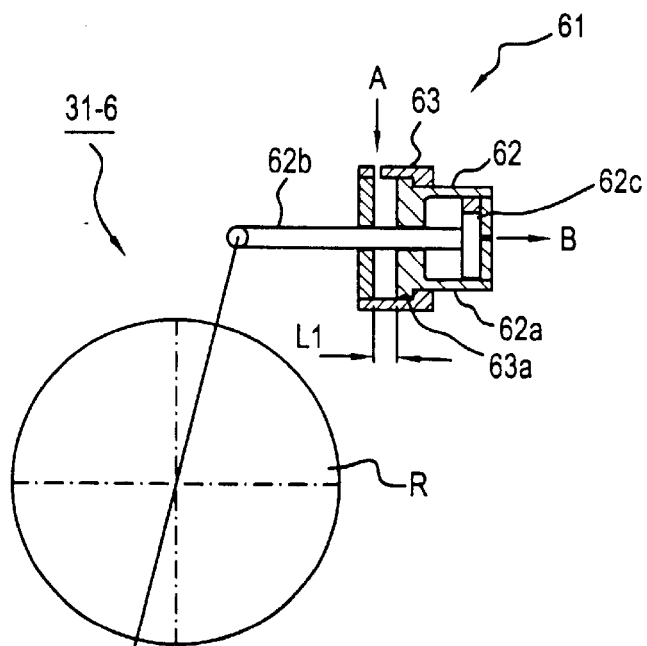
FIG. 14 is a schematic illustration of the structure of a fifth embodiment of an eddy current braking apparatus equipped with a pair of cylinders for switching between a braking and a non-braking state during a non-braking state.
Figure 15:
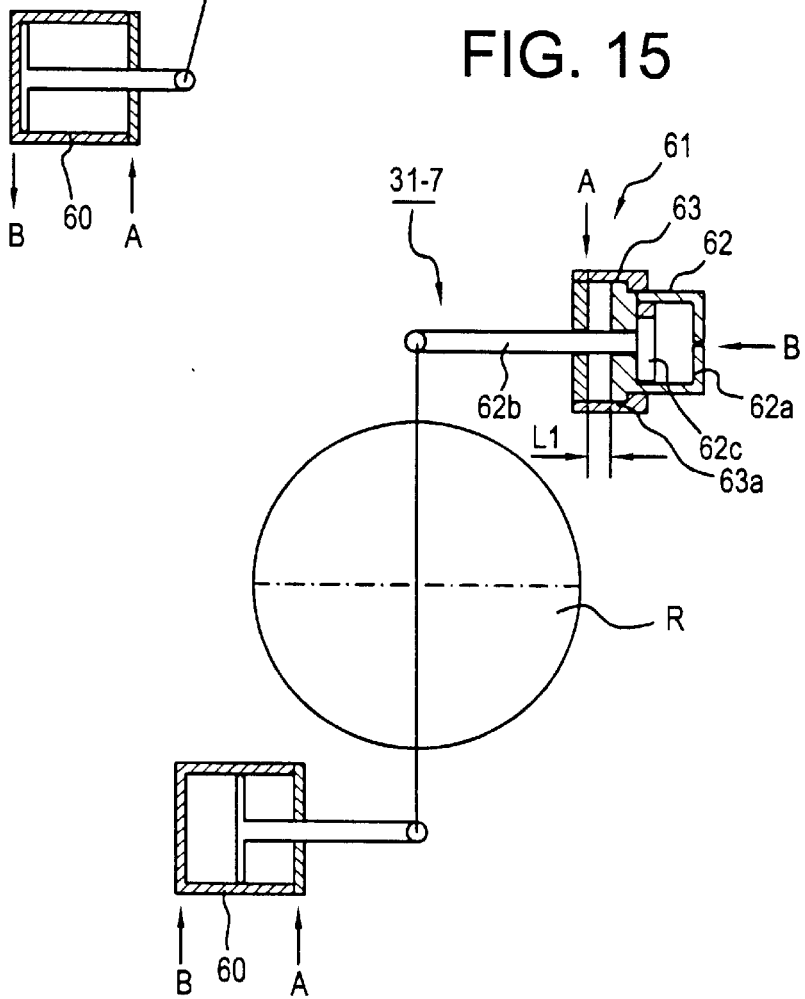
FIG. 15 schematically illustrates the eddy current braking apparatus of a FIG. 14 in a partial braking state.

Referring first to FIGS. 14–16, symbol R designates a single-row rotating-type eddy current braking apparatus having a pair of cylinders disposed on opposite sides thereof for rotating a support ring. This symbol is also used for the embodiments depicted in FIGS. 18–20 and 22–24.

In FIGS. 14–16, an actuator assembly 61 comprises a first actuator 62 and a second actuator 63. The first actuator 62 has a cylinder 62*a*, and a piston 62*c* is slidably disposed inside the cylinder 62*a*. A piston rod 62*b* extends from the piston 62*c*, and through an opening in an end wall of cylinder 62*a* and another opening in an end wall of cylinder 63*a*.

The first actuator 62 and the second actuator 63 are independent of each other, with the first actuator 62 acting as a piston of the second actuator 63. The piston rod 62*b* of the first actuator 62 also acts as the piston rod for the second actuator 63. In other words, the actuator assembly 61 employs a double piston arrangement, (62*c*,62*b*) and (62, 62*a*).

An actuator assembly 61 is used as one cylinder, and a single-stage cylinder 60 is used as another cylinder to perform switching of an eddy current braking apparatus R between a braking and a non-braking state.

The operation of the assembly 61 and actuator 60 will now be described. FIG. 16 shows the braking apparatus in a braking state. In order to rotate the support ring from the braking state to the non-braking state shown in FIG. 14, compressed air is supplied to ports A of the actuator assembly 61 and the single-stage cylinder 60, and compressed air is discharged from ports B of the actuator assembly 61 and the single-stage cylinder 60.

As a result of the application of compressed air at both ports A, force acts to the right in FIG. 16 to move the cylinder 62*a* of the first actuator 62 from the state shown in FIG. 16 by just a stroke L1, see FIG. 14. Then, after moving 62*a* by a distance L1, the piston rod 62*b* of the first actuator 62 is moved to the right from the state shown in FIG. 15 by continued compressed air supply to A in the single-stage cylinder 60. It should be noted that the cylinder 63 acts as a stop against further movement of cylinder 62 to the right, so that only piston rod 62*b* and piston 62*c* move to complete the transition from the braking state of FIG. 16 to the non-braking state of FIG. 14. In other words, the cylinder 60 alone completes the transition.

When rotating the support ring from the non-braking state shown in FIG. 14 to the partial braking position shown in FIG. 15, as shown in FIG. 15, compressed air is supplied to both of ports A and ports B of the actuator assembly 61 and the single-stage cylinder 60.

Figure 38:
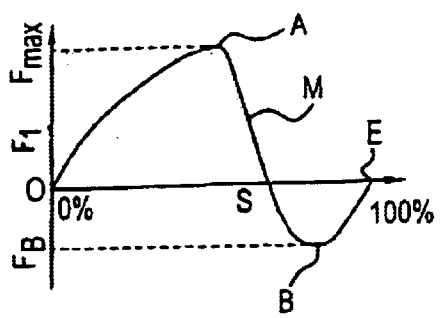
FIG. 38 is a graph of an example of the relationship between the force of a pneumatic cylinder and the stroke thereof in an eddy current braking apparatus.
Figure 39:
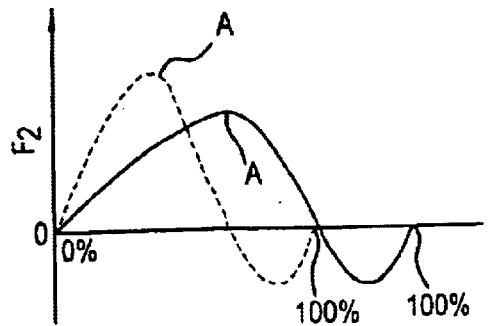
FIG. 39 is a graph showing examples of the force of a pneumatic cylinder as a function of the stroke thereof for two different types of eddy current braking apparatus.

As a result of applying compressed air to both ports in both the assembly 61 and actuator 60, just the piston rod 62*b* and piston 62*c* move from the state shown in FIG. 14 to the left and to the end wall of cylinder 62*a* as in FIG. 15. The partial braking position, position M shown in FIG. 38, is then maintained. At this partial braking position M, the first actuator 62 is independent of the second actuator 63, so the first actuator 62 and the second actuator 63 together do not exert a net force, and the partial braking position M can be maintained with good stability. In addition, the diameter of the second actuator 63 need only be such that the first actuator 62 can move freely therein, so the diameter of the second actuator 63 with respect to the first actuator 62 need not be so large.

Now going from the partial braking state of FIG. 15 to the braking state of FIG. 16, compressed air is supplied to port B of each of assembly 61 and actuator 60, and compressed air is discharged from port A of each of assembly 61 and actuator 60. This results in the piston rod 62b and piston 62c traveling to the left by just a stroke L1 when viewing FIG. 15, and the cylinder 62 seats against the end wall of the cylinder 63a.

While the FIGS. 14–16 embodiment uses both assembly 61 and actuator 60, the actuator 60 is optional as shown in the embodiment of FIGS. 17a–17c. As shown in FIG. 17a, one coil spring 64a is disposed between the cylinders of the first actuator 62 and the second actuator 63 and another spring 64b is disposed between the piston 62c and the end wall of cylinder 62a. With this arrangement, there is no need for the assistance of a single-stage cylinder 60. Operation from the non-braking state shown in FIG. 17a to thy braking state shown in FIG. 17c through the partial braking position shown in FIG. 17b and the reverse operation can be carried out by the appropriate application of compressed air as described for FIGS. 14–16. One difference though is that compressed air in B will drive piston 62c and the spring 64a will drive the second cylinder 62 for braking (FIG. 17c). and compressed air in A and B will control the partial braking position (FIG. 17b). The spring bias will move the piston 62c to the non-braking state (FIG. 17a) or the braking state (FIG. 17c) without the need to drive the piston rod 62b as done in the embodiment of FIGS. 14–16.

With the actuator assembly 61 and the variations described above and below, the ability to maintain a partial braking position with stability is excellent. However, in some instances, it may be necessary to increase thrust when moving from a non-braking state to a braking state, and correspondingly increase the diameter of the first actuator 62. This then causes the diameter of the second actuator 63 housed within the first actuator 62 to necessarily increase, and an installation space problem on a vehicle may occur.

Figure 18:
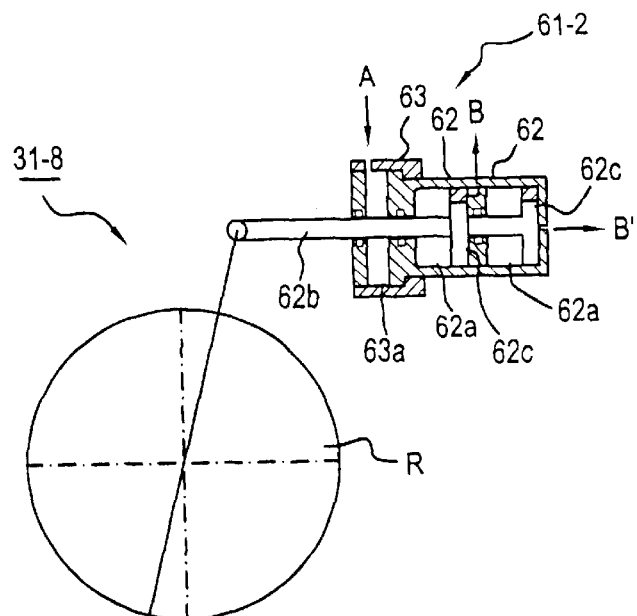
FIGS. 18–20 are schematic views of a first actuator and a single-stage cylinder used in a variation of the eddy current braking apparatus of FIG. 14.
Figure 19:
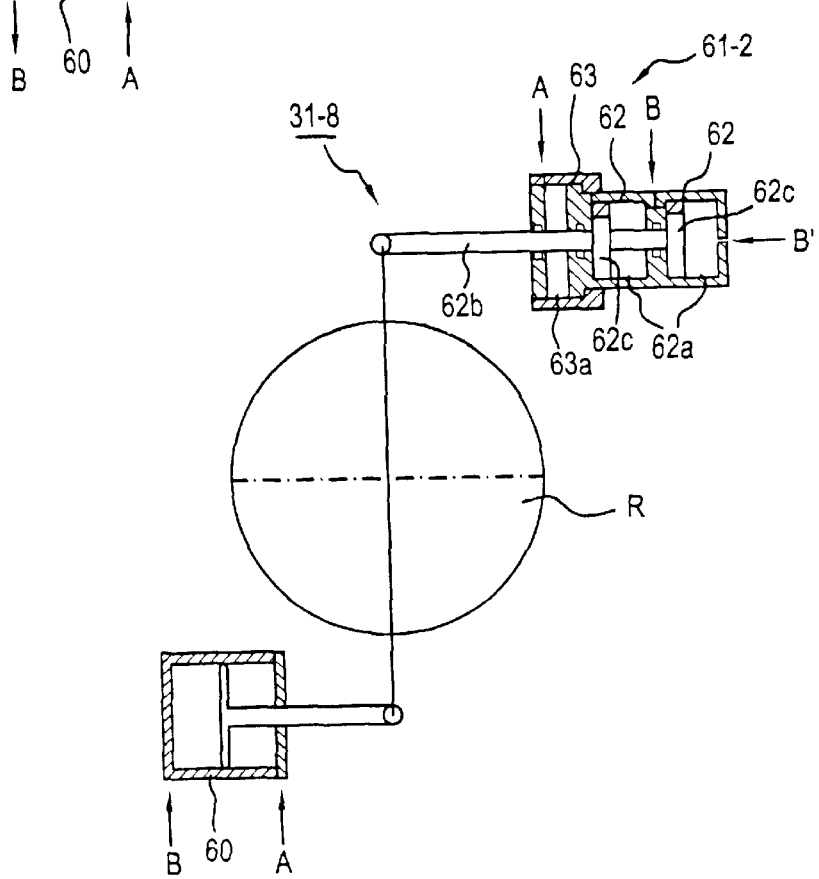
Figure 20:
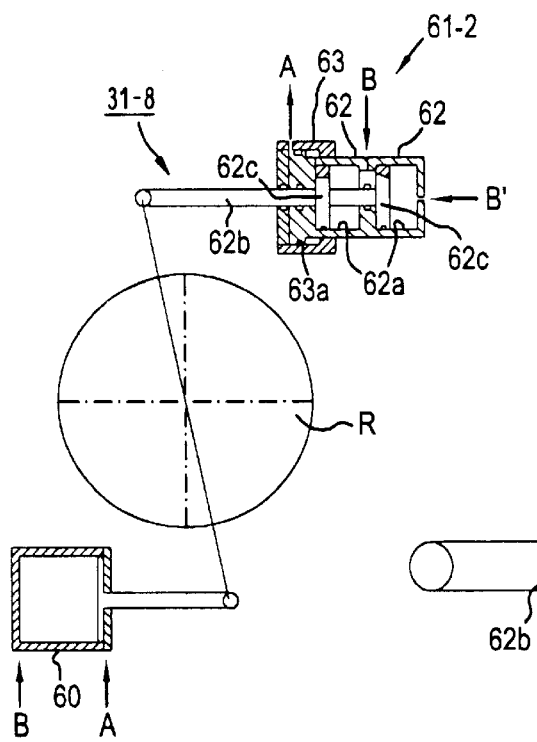

Another variation of the invention, i.e., the embodiment depicted in FIGS. 18–20 addresses this problem by dividing the first actuator 62 into two portions arranged in series. With this arrangement, even when the thrust is increased, the diameter of the first actuator 62 can be made as small as possible.

The operation from the non-braking state shown in FIG. 18 to the partial braking position M shown in FIG. 19, to the braking state shown in FIG. 20, and the reverse operation is the similar to the first actuator 62 according to the present invention shown in FIGS. 14–16. The difference is that the supply and discharge of compressed air is performed simultaneously with respect to port B and port B' of the first actuator 62 which is divided into two portions arranged in series.

As is the case with the actuator assembly 61 of FIGS. 14–16, the variation shown in FIGS. 18–20 has the assistance of the single-stage cylinder 60.

Figure 21A:
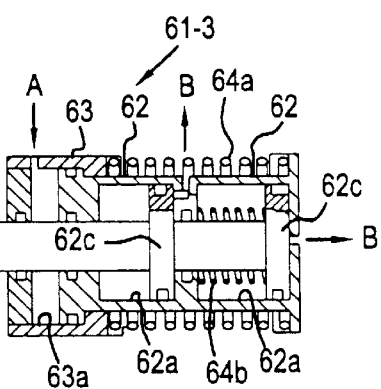
FIG. 21a is a longitudinal cross-section view of a second actuator used in a variation of the eddy current braking apparatus of FIG. 14 in a non-braking state.
Figure 21B:
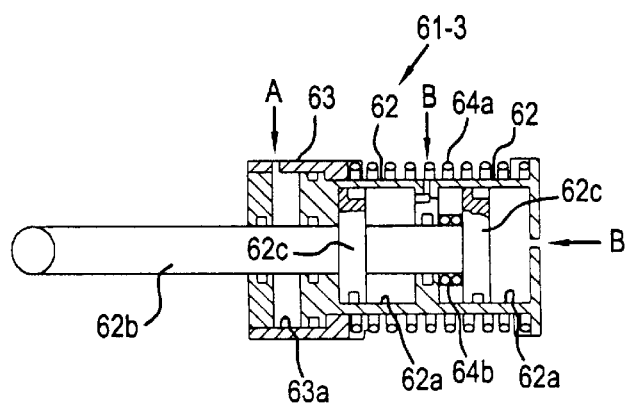
FIG. 21b shows the actuator in a partial braking state.
Figure 21C:
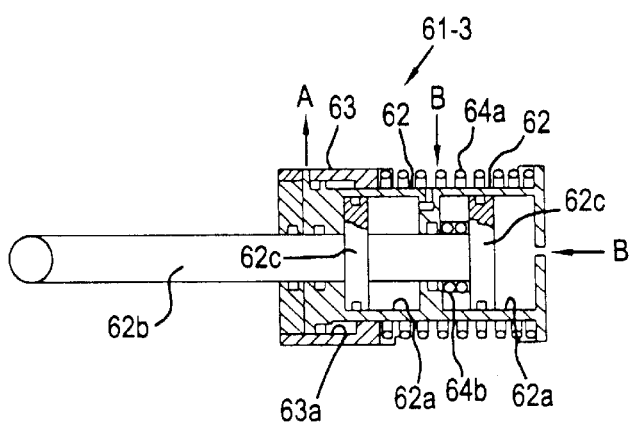
FIG. 21c shows the actuator in a braking state.

FIGS. 21a–21c show a variation wherein the embodiment of FIGS. 18–20 does not require the actuator 60. As shown in FIG. 21a, the piston rod 62b has a pair of piston heads 62c, each disposed in a respective pressure receiving chamber of cylinder 62. Spring 64a is disposed between cylinder 62 and cylinder 63. Spring 64b is disposed in one of the pressure receiving chambers of cylinder 62 and between a wall separating the pressure receiving chambers and one of the pistons 62c (the chamber on the right when viewing FIG. 21(a)). In an alternative embodiment (not shown), the spring 64b could be positioned in the other pressure receiving chamber (the chamber on the left when viewing FIG. 21(a)) to function in the same manner as spring 64b of FIGS. 21(a–c).

Providing spring 64a and spring 64b allows operation from the non-braking state shown in FIG. 21a to the partial operating position M shown in FIG. 21b, to the braking state shown in FIG. 21c, and the reverse operation as well by application/discharge of the appropriate compressed air via ports A and B, and spring bias of the springs 64a and 64b. Entry or discharge of compressed air is represented in each FIGS. 21a–21c by direction of the appropriate arrow. For example, in FIG. 21a, air enters at A and is discharged at both B ports. FIG. 21a also shows how the spring bias of springs 64a and 64b drive the cylinder 62a and the piston 62c and rod 62b to the right to achieve the non-braking state.

Figure 22:
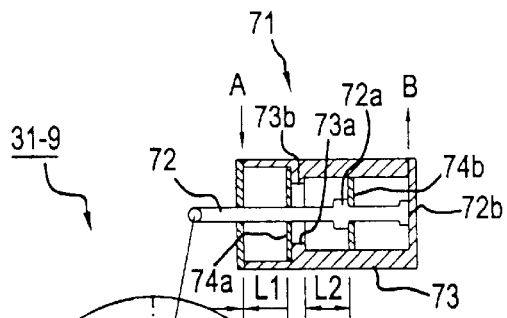
FIGS. 22–24 are schematic illustrations corresponding to FIGS. 14–16, respectively, using the actuator of FIGS. 21a–21c.
Figure 23:
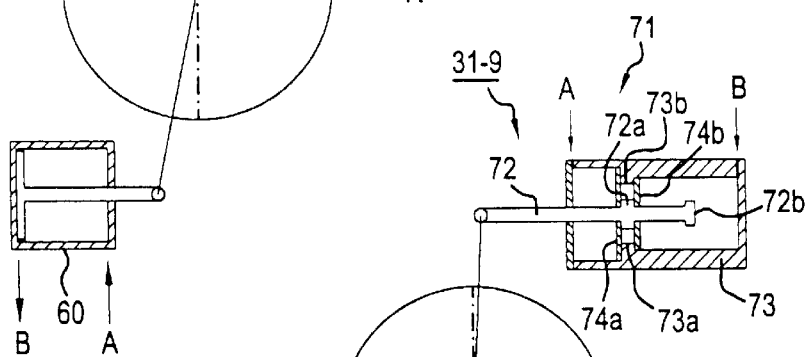
Figure 24:
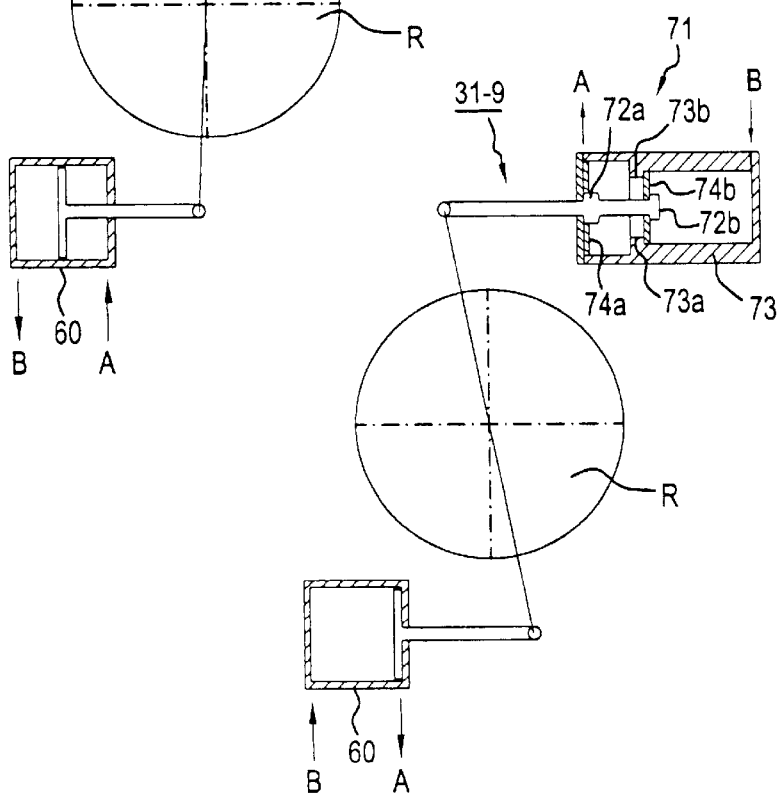

FIGS. 22–24 show yet another actuator embodiment having an actuator assembly 71. The assembly 71 includes a piston rod 72 having a stopper 72a projecting positioned along its midportion, and a cylinder 73 having a stopper 73a provided at the midportion of its inner peripheral surface. Free pistons 74a and 74b are disposed in cylinder 73a on opposite sides of both the stopper 72a of the piston rod 72 and the stopper 73a of the cylinder 73. Each of the pistons 74a and 74b can freely move within the cylinder 73 with respect to each other. Reference number 72b indicates a stopper formed on one end of piston rod 72 for preventing free piston 74b from coming off, and reference number 73b indicates an opening communicating with the atmosphere formed in stopper 73a of the cylinder 73.

The actuator assembly 71 is capable of performing the same switching operation of a single-row rotating-type eddy current braking apparatus between a braking and a non-braking state in the same manner as the actuator assembly 61.

For switching between a braking and a non-braking state using actuator assembly 71 and the single-stage cylinder 60 rotating the support ring from the braking state shown in FIG. 24 to the non-braking state shown in FIG. 22, is achieved by supplying compressed air, for example, to ports A of cylinder 73 and the single-stage cylinder 60, and discharging compressed air from ports B of cylinder 73 and the single-stage cylinder 60.

As a result, referring to FIG. 24, a force acts on free piston 74a to move it to the right, and free piston 74a and piston rod 72 move together by a stroke L1 (see FIG. 22) until free piston 74a contacts the stopper 73a of cylinder 73. After free piston 74a contacts stopper 73a of cylinder 73, the single-stage cylinder 60 first pushes piston rod 72 which in turn pushes free piston 74b via stopper 72a to the right from the position.

When rotating the support ring from the non-braking state shown in FIG. 22 to the partial braking position shown in FIG. 23, as shown in FIG. 23, compressed air is supplied to both of ports A and ports B of cylinder 73 and single-stage cylinder 60. As a result, the piston rod 72 is pressed by the free piston 74b, and the rod 72 in FIG. 22 moves to the left until free piston 74b contacts stopper 73a of cylinder 73, and is then maintained in the partial braking position shown in FIG. 23.

In the partial braking position shown in FIG. 23, the movement of the two free pistons 74a and 74b is restricted by stopper 73a on the inner surface of cylinder 73 and the movement of stopper 72a and therefore piston rod 72 is restricted by the two free pistons 74a and 74b, which are restricted by stopper 73a, so the actuator 71 is maintained with good stability in the partial braking position. Maintenance of the partial braking position is carried out not by the difference in pressures within cylinder 73 but by stopper 73a provided on the inner surface of cylinder 73, so the cylinder diameter of both end chambers can be freely and independently selected in accordance with the required operating force, an excess amount of air becomes unnecessary, and ease of mounting on a vehicle increases.

Going from the partial braking position shown in FIG. 23 to the braking state shown in FIG. 24, compressed air is supplied to ports B of the cylinder 73 and single-stage cylinder 60 and compressed air is discharged from ports A of the cylinder 73 and the single-stage cylinder 60.

The piston rod 72 is then moved by the single stage cylinder 60 (left in FIG. 23) just a stroke L1 until the free piston 74a contacts the end of the wall of the cylinder 73. The piston rod 72 is moved under only the force of the single-stage cylinder 60 from the partial braking position to the braking position.

As with the embodiments of FIGS. 14–16 and 18–20, the actuator assembly 71 uses the single-stage cylinder 60 to switch between a non-braking state and a braking state and from a braking state to a non-braking state.

Figure 25A:
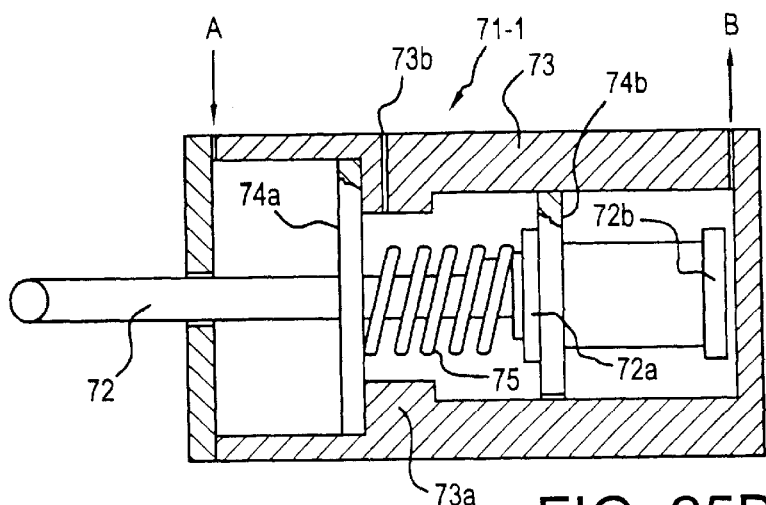
FIG. 25a is longitudinal cross-sectional view of a first actuator for use in a variation of the eddy current braking apparatus of FIG. 14 in a non-braking state.
Figure 25B:
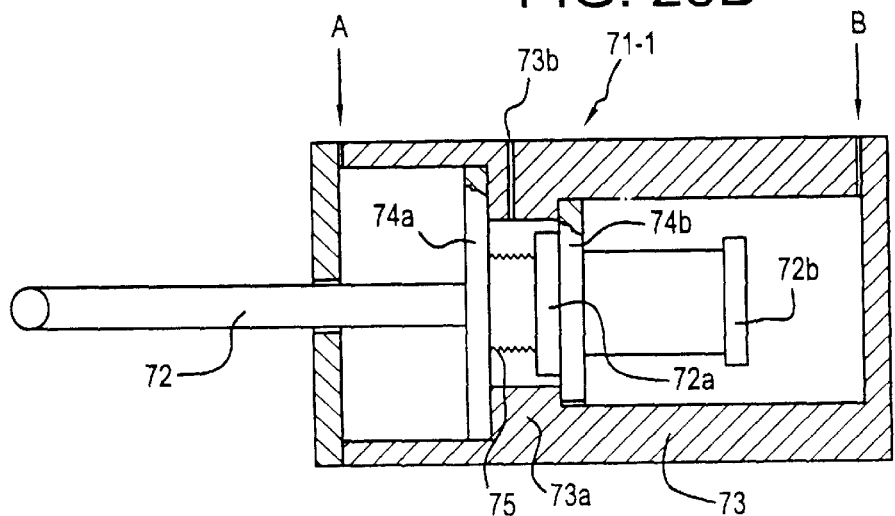
FIG. 25b shows the actuator in a partial braking state.
Figure 25C:
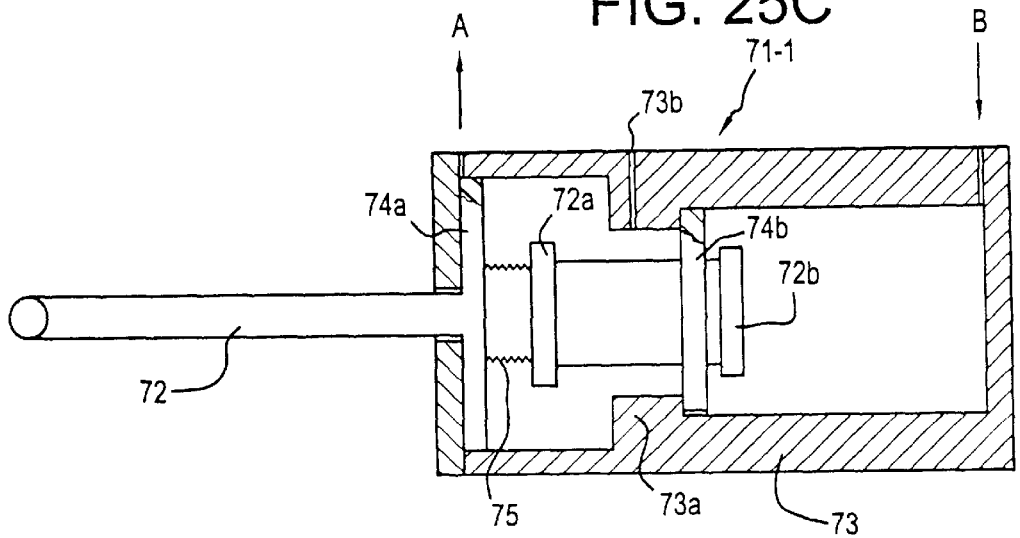
FIG. 25c shows the actuator in a braking state.

As another variation, an actuator assembly 71-1 functions without the single-stage cylinder 60 by using a coil spring as shown in FIGS. 25a–25c. A coil spring 75 can be disposed between the free piston 74a and the stopper 72a, and the actuator can switch between the various states with the appropriate supply/discharge of air using ports A and B as described for the other coil-spring employing actuators described above.

As described above, using this embodiment of actuator assemblies 61, 71 as a switching mechanism for switching an eddy current braking apparatus R between a braking and a non-braking state, offers advantages in terms of the size of the actuator and air consumption. When performing the operation from the non-braking state shown by point O in FIG. 38 to the partial braking position M, the diameters of piston 62c (cylinder 62a) and piston 74b (cylinder 73) can be just the diameter for generating a thrust to go beyond point A. Thus, the diameter of cylinder 63a of the second actuator 63 and the diameter of free piston 74a (cylinder 73) are irrelevant.

Conversely, when operating from the braking state shown by point E in FIG. 38 to the partial braking position M, the diameter of cylinder 63a of the second actuator 63 and the diameter of free piston 74a (cylinder 73) can be just large enough to generate a thrust to go beyond point B, and the diameters of piston 62c (cylinder 62a) and free piston 74b (cylinder 73) are irrelevant.

Consequently, the irrelevancy of certain pistons in terms of the described braking/partial/non-braking states restrains the consumption of air, reduces the diameter of the actuator, and facilitates the mounting of the eddy current braking apparatus on a vehicle.

In order to demonstrate the improvements associated with the inventive braking apparatus, a performance test was carried out using a braking apparatus as shown in FIGS. 1–3, wherein 12, 16, and 18 magnetic poles were utilized. The results of this test are shown in the graphs of FIGS. 26 and 27.

Figure 26:
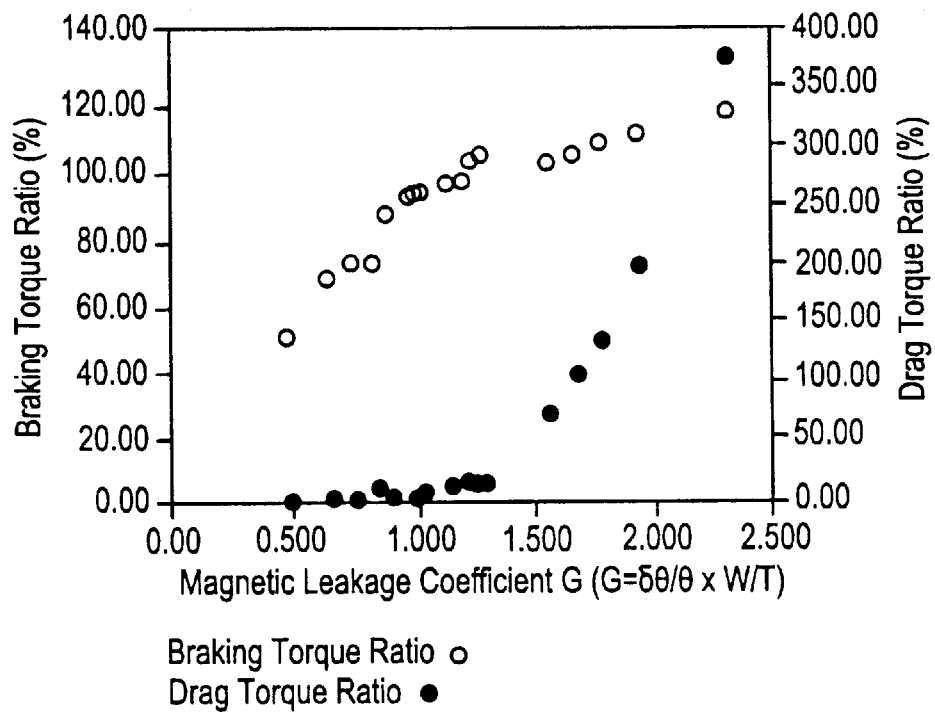
FIGS. 26 and 27 are graphs of the properties of the first embodiment.

As shown in FIG. 26, the magnetic leakage coefficient G for the tested eddy current braking apparatus varied between 0.50 and 2.312 (the ratio W/w of the width W of the switching plates 35 and the width w of the permanent magnets 34 equaling 1.0). When the magnetic leakage coefficient G was in the range of 0.7–1.5 corresponding to a high speed vehicle in which the final reduction ratio is greater than 3.3, the braking torque ratio (shown by open circles in FIG. 26) was 70–105 percent, wherein a ratio of 100 percent corresponds to a braking torque of 588 N·m at the time of braking. Furthermore, the drag torque ratio (shown by solid circles in FIG. 26) was 0.9–63 percent, wherein a ratio of 100 percent corresponds to a drag torque of 9.8 N·m during a non-braking state. Both of these are extremely good values.

Furthermore, in a range for the magnetic leakage coefficient G of 0.75–2.25 corresponding to a low or medium speed vehicle in which the final reduction ratio is at most 3.3, the braking torque ratio (shown by open circles in FIG. 26) was 70–109 percent, wherein a ratio of 100 percent corresponds to a braking torque of 588 N·m during a braking state. The drag torque ratio (shown by solid circles in FIG. 26) was 0.9–197 percent, wherein a ratio of 100 percent corresponds to a drag torque of 9.8 N·m. Both of these were extremely good values.

Figure 27:
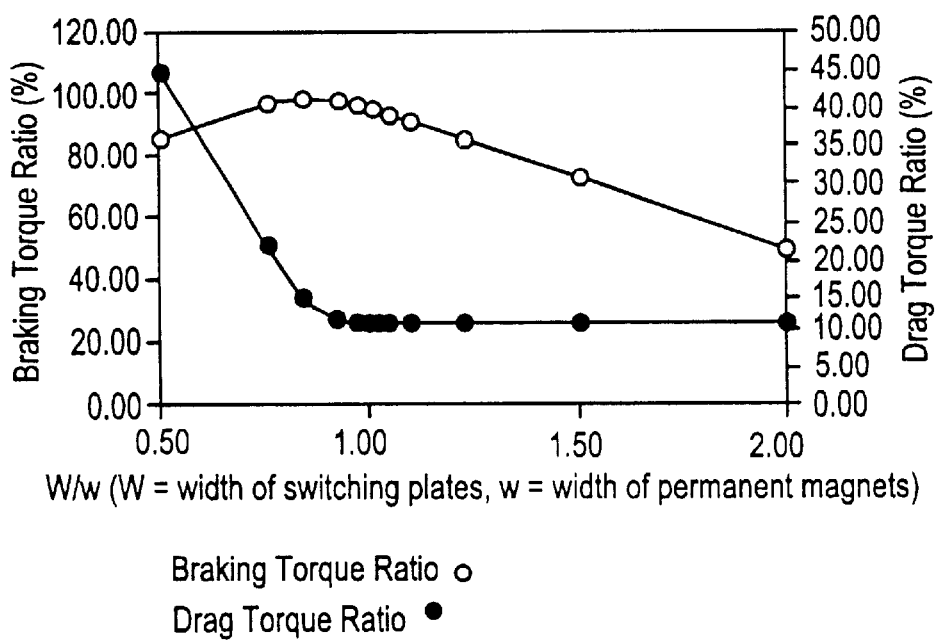

Referring to FIG. 27, the ratio W/w of the width W of switching plates 35 to the width w of permanent magnets 34 was varied in the range of 0.5–2.0 for an eddy current braking apparatus for a high speed vehicle having 16 magnetic poles and a magnetic leakage coefficient G of 1.150. When W/w was in the range of 0.7–1.5, the drag torque during a non-braking state (shown by solid circles in FIG. 27) was suppressed, while a decrease in the braking torque during a braking state (shown by open circles in FIG. 27) could be suppressed to a minimal value.

The vertical axes in FIG. 27 show the braking torque ratio, with a ratio of 100 percent corresponding to a braking torque of 588 N·m, and the drag torque ratio, with a ratio of 100 percent corresponding to a drag torque of 9.8 N·m.

To further show the benefits of the invention, the effects of the braking apparatus 31-5 shown in FIGS. 9–11 were ascertained.

As described previously, air is supplied to the pneumatic cylinder 56 of eddy current braking apparatus 31-5, as shown in FIG. 11, to the side of piston 56b having the larger pressure receiving area. This projects piston rod 56a to rotate support ring 52 in a direction coinciding with the direction of rotation of rotor 55 when switching from a non-braking state to a braking state. This action results in a remarkable effect as described below.

Figure 28:
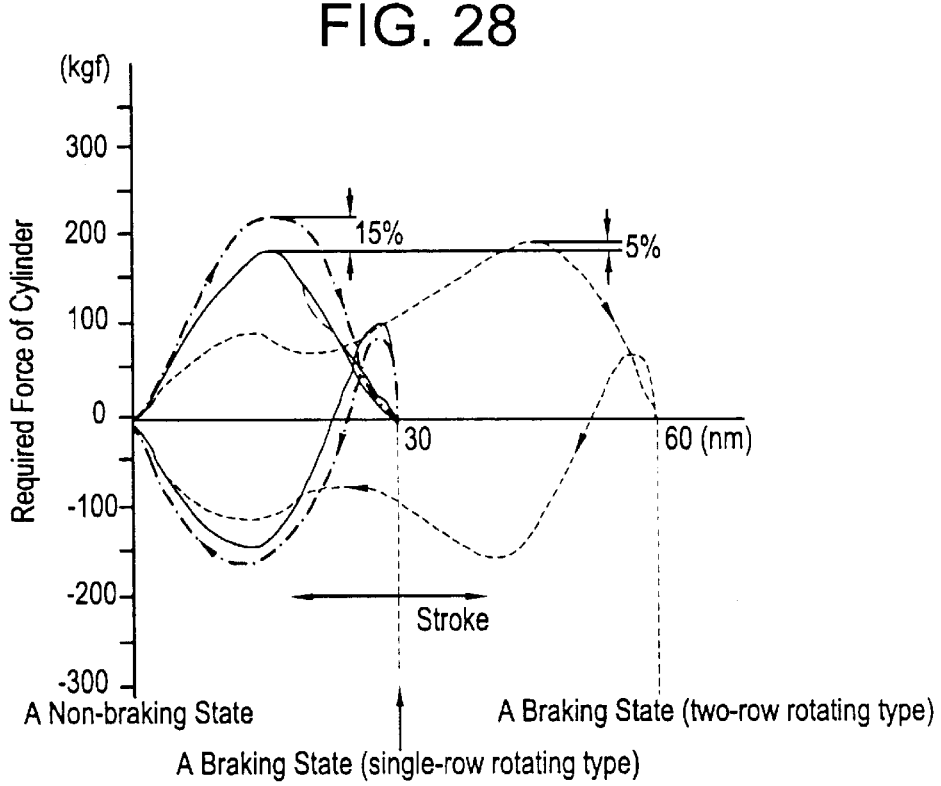
FIGS. 28 and 29 are graphs of the properties of the second embodiment.

In FIG. 28, the force of pneumatic cylinder 56 when switching from a non-braking state to a braking state back to a non-braking state is compared for this embodiment of an eddy current braking apparatus 31-5 (solid line), a conventional single-row rotating-type eddy current braking apparatus (the long and short dashed line), and a conventional two-row rotating-type eddy current braking apparatus (dashed line).

FIG. 28 shows that use of the single-row braking apparatus 31-5 could reduce the maximum force by approximately 15 percent compared to the conventional single-row rotating-type eddy current braking apparatus, and also could reduce the force during overall operation. Furthermore, the single-row apparatus 31-5 could reduce the maximum force by approximately 5 percent compared to the conventional two-row rotating-type eddy current braking apparatus.

Figure 29:
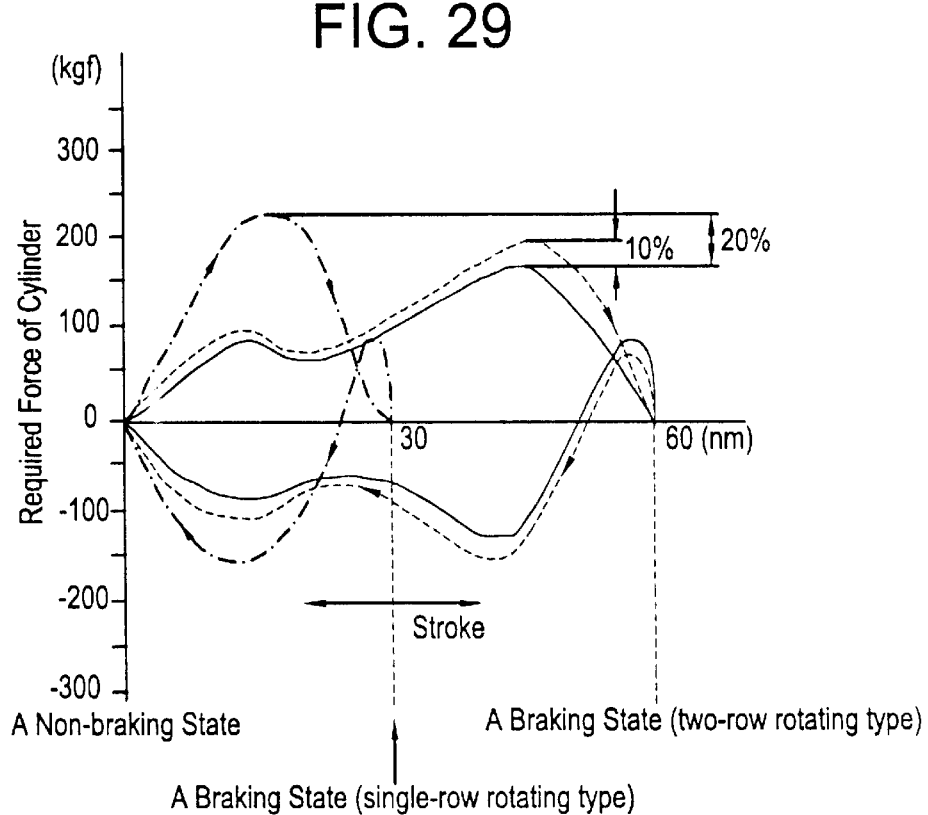
Figure 30:
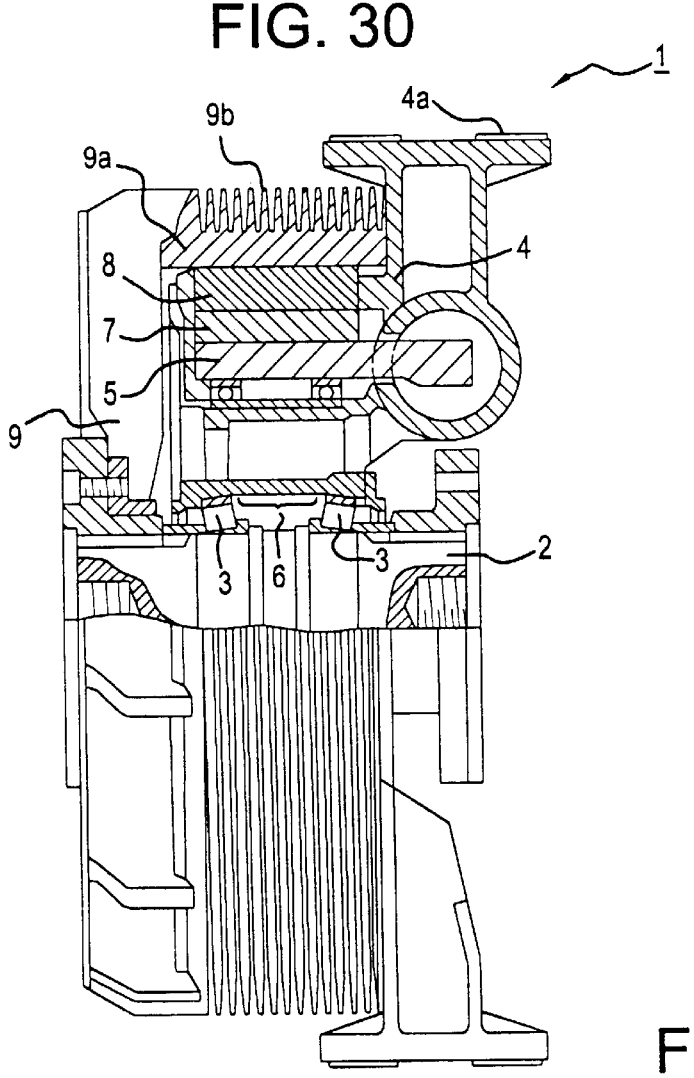
FIG. 30 is a cutaway side elevation of a single-row rotating-type eddy current braking apparatus described in Japanese Published Unexamined Patent Application Hei 1-298948.
Figure 31:
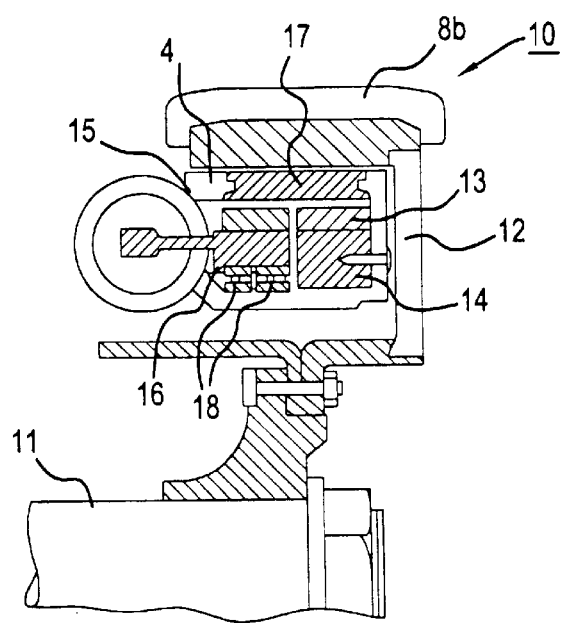
FIG. 31 is a longitudinal cross-sectional view of a portion of a two-row rotating-type eddy current braking apparatus disclosed in Japanese Published Unexamined Patent Application Hei 7-118901.
Figure 32A:
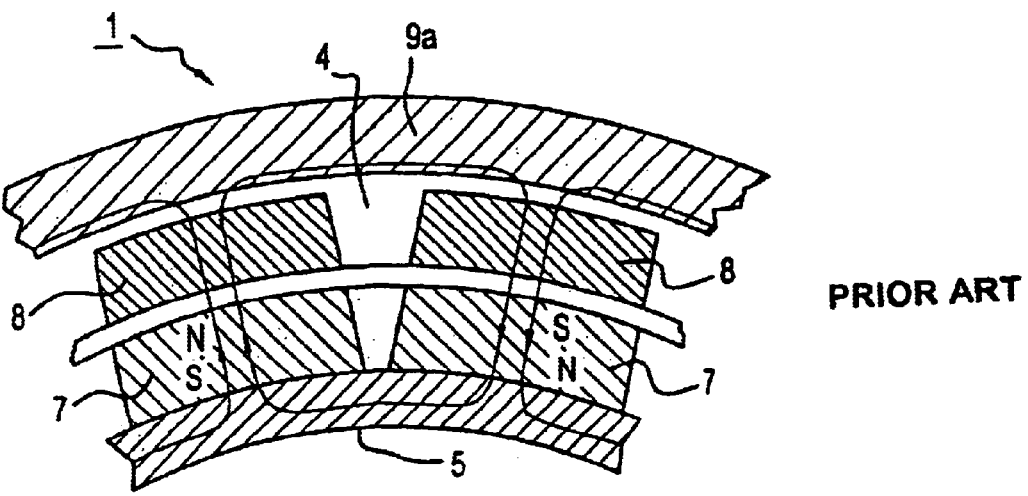
FIG. 32a is a transverse cross-sectional view of a portion of an eddy current braking apparatus in a braking state and FIG. 32b is a transverse cross-sectional view of the eddy current braking apparatus of FIG. 32a in a non-braking state.
Figure 32B:
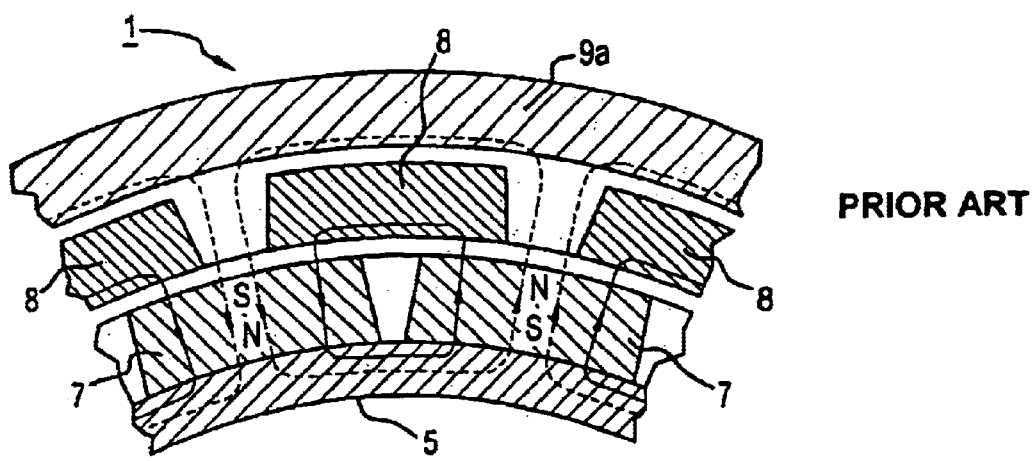
Figure 33A:
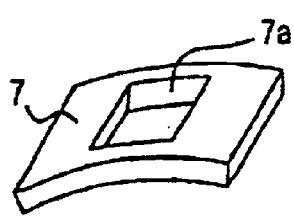
FIG. 33a and FIG. 33b are views of permanent magnets in an eddy current braking apparatus disclosed in Japanese Published Unexamined Patent Application Hei 5-211761.
Figure 33B:
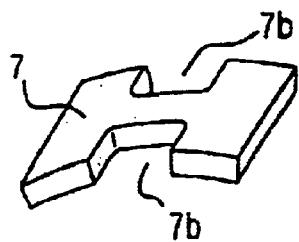
Figure 34:
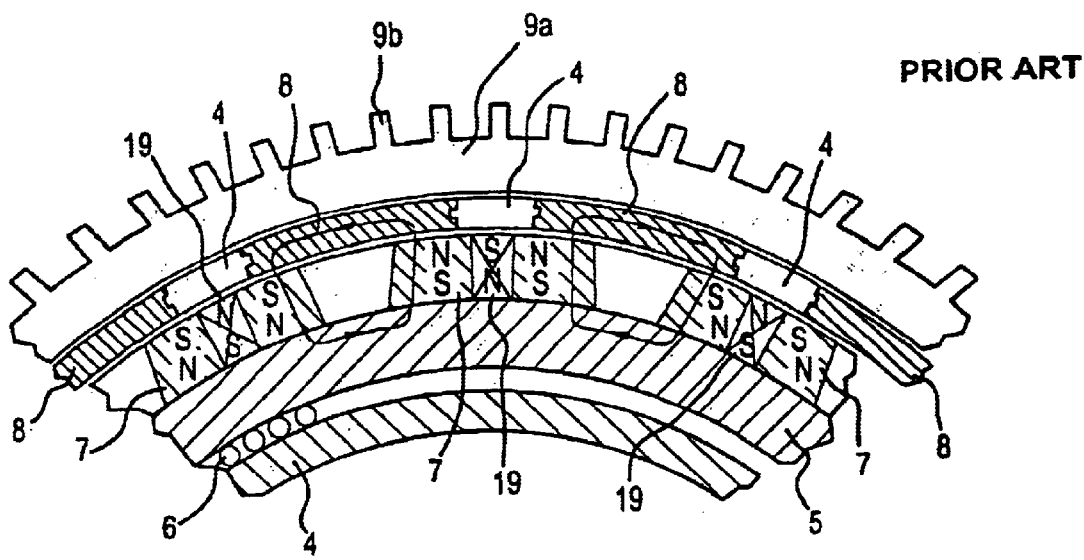
FIG. 34 is a transverse cross-sectional view of a portion of an eddy current braking apparatus disclosed in Japanese Published Unexamined Patent Application Hei 6-165477.
Figure 35:
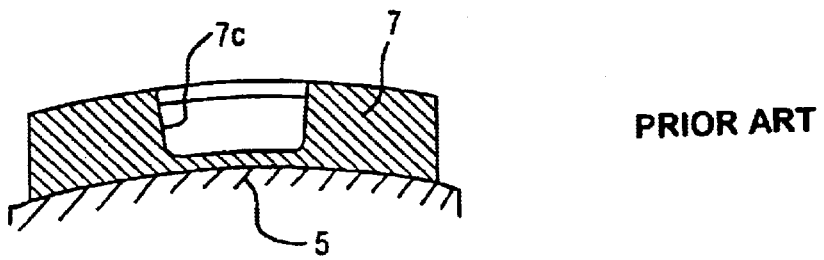
FIG. 35 is a transverse cross-sectional view of a magnet of an eddy current braking apparatus disclosed in Japanese Published Unexamined Patent Application Hei 6-189522.
Figure 36:
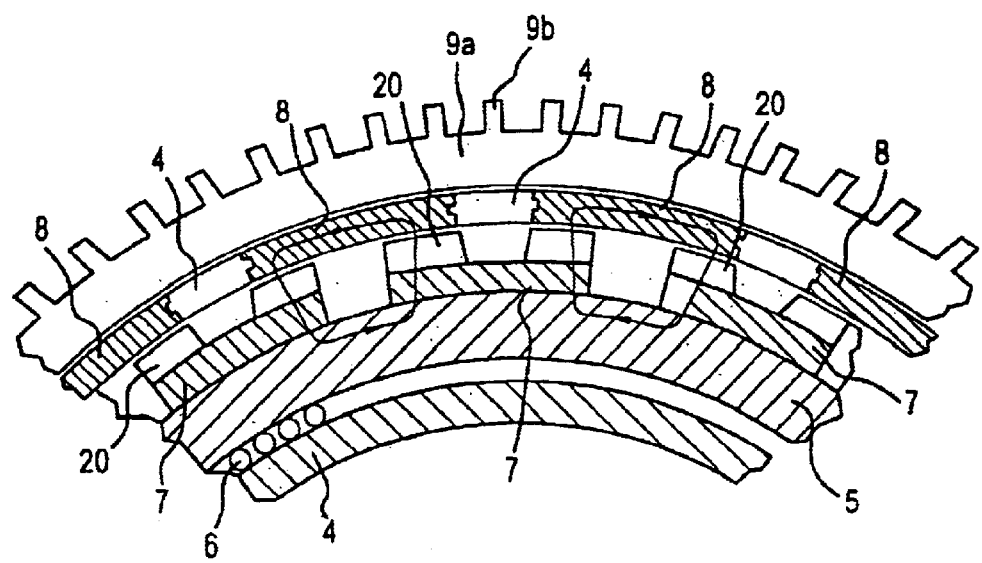
FIG. 36 is a transverse cross-sectional view of a portion of an eddy current braking apparatus disclosed in Japanese Published Unexamined Patent Application Hei 6-86534.
Figure 37A:
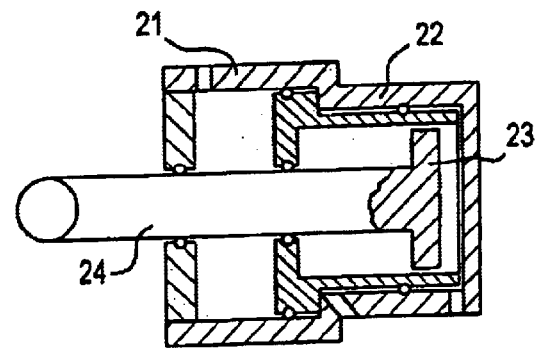
FIGS. 37a and 37b are longitudinal cross-sectional views of an actuator for use in an eddy current braking apparatus disclosed in Japanese Published Unexamined Utility Model Application Hei 6-48386.
Figure 37B:
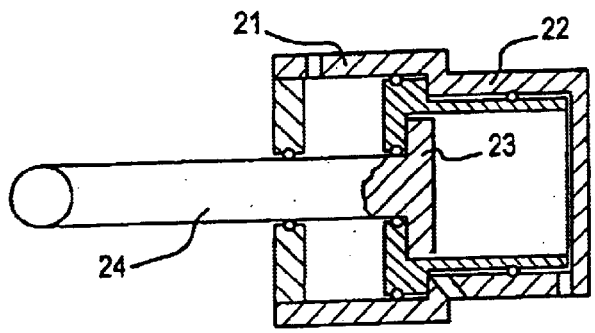

FIG. 29 applies the inventive concept to a two-row braking apparatus, and compares the force of the pneumatic cylinder when switching from a non-braking state to a braking state back to a non-braking state for a two-row rotating-type eddy current braking apparatus using the invention (solid line), a conventional two-row rotating-type eddy current braking apparatus (dashed line), and a conventional single-row eddy current braking apparatus (long and short dashed line).

FIG. 29 reveals that the two-row rotating-type eddy current braking apparatus using the invention could reduce the maximum force by approximately 10 percent compared to the conventional two-row rotating-type eddy current braking apparatus, and it could reduce the force for overall operation. In addition, the inventive two-row rotating-type eddy current braking apparatus could reduce the maximum force by approximately 20 percent with respect to the conventional single-row rotating-type eddy current braking apparatus.

A comparison of a single-row rotating-type eddy current braking apparatus and a two-row rotating-type eddy current braking apparatus is not illustrated. However, if one simply compares the force of the pneumatic cylinders, in general the force required of a two-row rotating-type eddy current braking apparatus can be made approximately 5 percent less than that of a single-row rotating-type eddy current braking apparatus when using the invention, i.e., compare FIG. 29 which shows that the two-row apparatus (solid line) is 20% better than conventional single row apparatus (long and short dashed line), whereas FIG. 28 shows that the single row apparatus (solid line) is only 15% better than the two-row apparatus (long and short dashed line). In other words, in general, less force is required to operate a two-row braking apparatus.

However, one must also take into account the advantages of the single-row apparatus over a two-row braking apparatus. Referring again to FIG. 28, the difference between a single-row rotating-type eddy current braking apparatus of the invention and a conventional single-row rotating-type eddy current braking apparatus was approximately 15 percent. The difference between a two-row rotating-type eddy current braking apparatus of the invention and a conventional two-row eddy current braking apparatus was approximately 10 percent, see FIG. 29. From this, it can be seen that the effects of the present invention are more prominent with a single-row type, i.e., 15% reduction versus 10% reduction.

Consequently, even though a conventional two-row braking apparatus may still require less force than the inventive single row apparatus, a single-row rotating-type eddy current braking apparatus has fewer parts and the cylinder stroke thereof is approximately half that of a two-row type. Thus, the cost and size of the overall single-row apparatus can be reduced as a result of being able to use a smaller pneumatic cylinder than in a conventional device. Therefore, the object of the present invention of reducing costs and size can be more effectively achieved with a single-row type.

The present invention offers significant improvements in the field of eddy current braking apparatus. In the embodiment of FIG. 1, wherein the magnetic leakage coefficient that is found from the relationship $(\delta\Theta/\Theta) \times (W/T)$ of the width W and the thickness T of the switching plates, the angle $\delta\Theta$ between the end portions of adjoining switching plates in the circumferential direction, and the angle $\Theta$ between poles is restricted to a suitable value, the drag torque during a non-braking state can be greatly decreased without decreasing the braking force during a braking state. Therefore, a loss of braking force during a non-braking state can be suppressed.

In addition and unlike eddy current braking apparatus such as described in Japanese Published Examined Patent Application Hei 7-118901, it is not necessary to increase the thickness of the switching plates as the braking torque increases, and decreases in size and weight can be achieved.

The embodiment of the invention generally described in FIGS. 5–8 provides improvements in magnetic efficiency. In contrast to the conventional structure wherein a large gap must be maintained between the permanent magnets and the switching plates to account for thermal expansion as explained in the Background Art section, the size $\epsilon 1$ of the gap between permanent magnets and switching plates and the size $\epsilon 2$ of the gap between the support body (or support ring) and bearings of the inventive apparatus maintains substantially the same shape and the same dimensional changes with changes in temperature, so the gap $\epsilon 1$ can be made the smallest necessary size. As a result, compared to a conventional structure in which a support ring is rotated by a prescribed angle, the efficiency of a magnetic circuit is increased.

The configuration of the various components of the inventive apparatus as shown in FIGS. 5–6 also results in advantages in terms of securing the magnets to the support ring, less complicated manufacturing steps, and sealing of foreign matter. It is not necessary to rotate the permanent magnets that are housed in and secured in a support body through a support ring, so securing the permanent magnets to the support ring can be simplified. Casting of the support body around the support ring and making the support ring integral with the support body omits extra processing and increases accuracy. In addition, a drive portion can be installed on the outside of the support body, so it is easy to provide a structure for preventing the entry of water or foreign matter into the permanent magnets.

In addition, when the sliding surface of a bearing is a steel support ring, not an aluminum alloy casting support body as in prior art apparatus, inexpensive surface treatment can be performed thereon, see particularly FIGS. 6–8. In addition, because of this, a high accuracy can be easily obtained, so additional processing to obtain a high accuracy can be omitted.

Further, decreases in cost and size of the apparatus as a whole can both be achieved to a high degree when practicing the embodiment shown in FIG. 9. As noted above, rotating the support ring of a single-row rotating-type when performing switching from a non-braking state to a braking state by supplying air to the side of a piston having a larger pressure receiving area to project a piston rod in the rotational direction of a rotor, a maximum force needed within the rotational speed range of the rotor can be adequately generated even if a pneumatic cylinder with a small size and low air consumption is used.

Additionally, and in light of the embodiments described in FIGS. 14–25, a thrust can be obtained which is just adequate to satisfactorily maintain a partial braking position without the need for excess air, and decreases in size can be achieved to permit installation on a large vehicle.

As such, an invention has been disclosed in terms of preferred embodiments thereof which fulfills each and every one of the objects of the present invention as set forth above and provides new and improved eddy current braking apparatus.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A single-row rotating-type eddy current braking apparatus equipped with a hollow cylindrical rotor mounted on an output shaft or a power transmission shaft, a ferromagnetic support ring which is disposed inside the rotor, a plurality of permanent magnets which are installed on the outer peripheral surface of the support ring at constant intervals and which are arranged so that the orientations of the magnetic poles thereof alternate, a plurality of ferromagnetic switching plates disposed between the plurality of permanent magnets and the rotor at approximately the same installation angles as the installation angles of the plurality of permanent magnets and spaced from the plurality of permanent magnets and the rotor, and a cylindrical support body which is made of a non-magnetic material and which supports the support ring and the plurality of switching plates, the plurality of permanent magnets and the plurality of switching plates being installed so as to be capable of rotating with respect to each other by a prescribed angle with respect to the rotational center of the output shaft or the power transmission shaft, characterized in that when the thickness of the switching plates is T, the width of the switching plates is W, the angle with respect to the center of the output shaft or the power transmission shaft between the same ends of two adjoining switching plates is Θ, and the angle with respect to the center of the output shaft or the power transmission shaft between two opposing ends of adjoining permanent magnets is δΘ, the relationship $$0.75 \leq (\delta\Theta/\Theta) \times (W/T) \leq 2.5$$

is satisfied, wherein $(\delta\Theta/\Theta) \times (W/T)$ defines a magnetic coefficient, the magnetic coefficient being satisfied accordineg to the relationship in a vehicle having a final reduction ratio of at most 3.3 to provide improved braking torque and reduced drag torque.

2. An eddy current braking apparatus of claim 1, characterized in that the support ring of the plurality of switching plates are switched between a first state in which tie permanent magnets coincide with the switching plates and a second state in which the permanent magnets are positioned between two adjoining switching plates by being driven in the rotational direction by at least one single-rod double-acting cylinder, and the single-rod double-acting cylinder is installed so that switching from the second state to the first state can be carried out by projection of a piston rod.

3. An eddy current braking apparatus as claimed in claim 1, characterized in that when the width of the permanent magnets is w, the relationship $0.7 \leq (W/w) \leq 1.5$ is satisfied.

4. An eddy current braking apparatus of claim 1, characterized in that an overlapping state of the permanent magnets and the switching plates can be switched between a plurality of states by driving the support ring or the plurality of switching plates in a rotational direction by a two-stage actuator including a first actuator having a cylinder with a piston slidably disposed therein and a piston rod extending from the piston, and a second actuator having a cylinder in which the cylinder of the first actuator is slidably disposed so as to function as a piston for the second actuator, the piston rod of the first actuator extending from the cylinder of the second actuator and acting as a piston rod for both actuators.

5. An eddy current braking apparatus as claimed in claim 4, characterized in that a spring is provided between the cylinders of the first actuator and the second actuator, and in the pressure receiving chamber on the piston rod side of the first actuator.

6. An eddy current braking apparatus as claimed in claim 4, characterized in that the first actuator is constituted by a plurality of actuators arranged in series.

7. An eddy current braking apparatus as claimed in claim 6, characterized in that a spring is provided between the cylinders of the first actuator and the second actuator and in at least one of the pressure receiving chambers on the piston rod side of the plurality of actuators.

8. An eddy current braking apparatus of claim 1, characterized in that an overlapping state of the permanent magnets and the switching plates can be switched between a plurality of states by driving the support ring or the plurality of switching plates in a rotational direction by an actuator having two free pistons slidably fitting around a piston rod having a first end within a cylinder and a second end projecting from the cylinder, with a stopper being provided on the midportion of the inner peripheral surface of the cylinder and on the midportion of the piston rod between the two free pistons.

9. An eddy current braking apparatus as claimed in claim 8, characterized in that a spring is disposed between one of the free pistons and the stopper of the piston rod.

10. A single-row rotating-type eddy current braking apparatus equipped with a hollow cylindrical rotor mounted on an output shaft or a power transmission shaft, a ferromagnetic support ring which is disposed inside the rotor, a plurality of permanent magnets which are installed on the outer peripheral surface of the support ring at constant intervals and which are arranged so that the orientations of the magnetic poles thereof alternate, a plurality of ferromagnetic switching plates disposed between the plurality of permanent magnets and the rotor at approximately the same installation angles as the installation angles of the plurality of permanent magnets and spaced from the plurality of permanent magnets and the rotor, and a cylindrical support body which is made of a non-magnetic material and which supports the support ring and the plurality of switching plates, the plurality of permanent magnets and the plurality of switching plates being installed so as to be capable of rotating with respect to each other by a prescribed angle with respect to the rotational center of the output shaft or the power transmission shaft, characterized in that when the thickness of the switching plates is T, the width of the switching plates is W, the angle with respect to the center of the output shaft or the power transmission shaft between the same ends of two adjoining switching plates is Θ, and the angle with respect to the center of the output shaft or the power transmission shaft between two opposing ends of adjoining permanent magnets is δΘ, the relationship $$0.75 \leq (\delta\Theta/\Theta) \times (W/T) \leq 1.5$$

is satisfied, wherein $(\delta\Theta/\Theta) \times (W/T)$ defines a magnetic coefficient, the magnetic coefficient being satisfied according to the relationship in a vehicle having a final reduction ratio of at most 3.3 to provide improved braking torque and reduced drag torque.

11. An eddy current braking apparatus as claimed in claim 10, characterized in that when the width of the permanent magnets is w, the relationship $0.7 \leq (W/w) \leq 1.5$ is satisfied.

12. An eddy current braking apparatus of claim 10, characterized in that an overlapping state of the permanent magnets and the switching plates can be switched between a plurality of states by driving the support ring or the plurality of switching plates in a rotational direction by an actuator having two free pistons slidably fitting around a piston rod having a first end within a cylinder and a second end projecting from the cylinder, with a stopper being provided on the midportion of the inner peripheral surface of the cylinder and on the midportion of the piston rod between the two free pistons.

13. An eddy current braking apparatus as claimed in claim 12, characterized in that a spring is disposed between one of the free pistons and the stopper of the piston rod.

14. An eddy current braking apparatus of claim 10, characterized in that an overlapping state of the permanent magnets and the switching plates can be switched between a plurality of states by driving the support ring or the plurality of switching plates in a rotational direction by a two-stage actuator including a first actuator having a cylinder with a piston slidably disposed therein and a piston rod extending from the piston, and a second actuator having a cylinder in which the cylinder of the first actuator is slidably disposed so as to function as a piston for the second actuator, the piston rod of the first actuator extending from the cylinder of the second actuator and acting as a piston rod for both actuators.

15. An eddy current braking apparatus as claimed in claim 14, characterized in that a spring is provided between the cylinders of the first actuator and the second actuator, and in the pressure receiving chamber on the piston rod side of the first actuator.

16. An eddy current braking apparatus as claimed in claim 14, characterized in that the first actuator is constituted by a plurality of actuators arranged in series.

17. An eddy current braking apparatus as claimed in claim 16, characterized in that a spring is provided between the cylinders of the first actuator and the second actuator and in at least one of the pressure receiving chambers on the piston rod side of the plurality of actuators.

18. In a method of producing a braking torque in a single row rotating type eddy current retarder braking apparatus for a vehicle wherein a plurality of magnets and switching plates, each radially spaced from a rotational center of a powered shaft and spaced from each other, are aligned with each other to create a magnetic circuit and to impose a braking torque on a rotor surrounding the magnets and switching plates, the improvement comprising rotating either the magnets with respect to the switching plates in only and always one direction of rotation, the one direction of rotation being the same as a rotational direction of the powered shaft while keeping the switching plates fixed to create the magnetic circuit, the rotational direction of the powered shaft corresponding to a forward movement of the vehicle, or rotating the switching plates with respect to the magnets in only and always a second direction of rotation, the second direction of rotation being opposite of the rotational direction of the powered shaft while the magnets are fixed to create the magnetic circuit, wherein less force is required to drive the magnets or switching plates during rotation that creates the magnetic circuit as compared to the force required in either a single row rotating type eddy current retarder brake apparatus with magnets that rotate opposite said one direction to create the magnetic circuit or a single row rotating type eddy current retarder brake apparatus with switching plates that rotate opposite said second direction to create the magnetic circuit.

19. The method of claim 18, further comprising rotating either the switching plates or the magnets between a braking state wherein the magnets and the switching plates are aligned, and a non-braking state wherein the magnets and switching plates are misaligned to disrupt the magnetic circuit.

20. The method of claim 19, wherein, the rotation of either the switching plates or magnets includes a partial braking position wherein the magnets and switching plates are partially aligned with respect to each other in a position between the braking state and the non-braking state.

21. The method of claim 18, characterized in that when the thickness of each of the switching plates is T, the width of each of the switching plates is W, the angle with respect to the center of the powered shaft between the same ends of two adjoining switching plates is $\Theta$, and the angle with respect to the center of the powered shaft between two opposing ends of two adjoining switching plates is $\delta\Theta$, the relationship $$0.75 \leq (\delta\Theta/\Theta) \times (W/T) \leq 2.25$$

is satisfied, wherein $(\delta\Theta/\Theta) \times (W/T)$ defines a magnetic coefficient, the magnetic coefficient being satisfied according to the relationship in a vehicle having a final reduction ratio of at most 3.3 to provide improved braking torque and reduced drag torque.

22. The method of claim 18, characterized in that when the thickness of each of the switching plates is T, the width of each of the switching plates is W, the angle with respect to the center of the powered shaft between the same ends of two adjoining switching plates is $\Theta$, and the angle with respect to the center of the powered shaft between two opposing ends of two adjoining switching plates is $\delta\Theta$, the relationship $$0.75 \leq (\delta\Theta/\Theta) \times (W/T) \leq 1.5$$

is satisfied, wherein $(\delta\Theta/\Theta) \times (W/T)$ defines a magnetic coefficient, the magnetic coefficient being satisfied according to the relationship in a vehicle having a final reduction ratio greater than 3.3 to provide improved braking torque and reduced drag torque.

23. In a single row rotating eddy current braking apparatus positioned between a powered shaft and a cylindrical rotor supported by the powered shaft and adapted to impose a braking force on the rotor for braking of the powered shaft, the apparatus having a plurality of circumferentially spaced magnets on a support ring, a plurality of circumferentially spaced switching plates on a support body, each of the magnets, the switching plates and the rotor radially spaced from an axis of the rotation of the powered shaft, with each of the switching plates radially spaced between an inner surface of the rotor and outer circumferential surfaces of the magnets, alignment of the magnets and switching plates creating a magnetic circuit for the braking force on the rotor, the improvement comprising:

each of the switching plates being sized and spacing between the adjoining switching plates being controlled to follow the relationship $0.75 \leq (\delta\Theta/\Theta) \times (W/T) \leq 2.25$, wherein T is the thickness of the switching plates, W is the width of the switching plates, $\Theta$ is the angle with respect to the axis of the powered shaft between the same ends of two adjoining switching plates, and $\delta\Theta$ is the angle with respect to the axis of the powered shaft between opposing ends of adjoining switching plates, wherein $(\delta\Theta/\Theta) \times (W/T)$ defines a magnetic coefficient, the magnetic coefficient being maintained according to the relationship in a vehicle having a final reduction ratio of no more than 3.3 to provide improved braking torque and reduced drag torque.

24. The apparatus of claim 23, wherein the relationship $0.7 \leq (W/w) \leq 1.5$ is satisfied, and w is a width of each permanent magnet.

25. In a single row rotating eddy current braking apparatus positioned between a powered shaft and a cylindrical rotor supported by the powered shaft and adapted to impose a braking force on the rotor for braking of the powered shaft the apparatus having a plurality of circumferentially spaced magnets on a support ring, a plurality of circumferentially spaced switching plates on a support body, each of the magnets, the switching plates and the rotor radially spaced from an axis of the rotation of the powered shaft with each of the switching plates radially spaced between an inner surface of the rotor and outer circumferential surfaces of the magnets alignment of the magnets and switching plates creating a magnetic circuit for the braking force on the rotor, the improvement comprising:

each of the switching plates being sized and spacing between the adjoining switching plates being controlled to follow the relationship $0.75 \leq (\delta\Theta/\Theta) \times (W/T) \leq 1.5$, wherein T is the thickness of the switching plates, W is the width of the switching plates, $\Theta$ is the angle with respect to the axis of the powered shaft between the same ends of two adjoining switching plates, and $\delta\Theta$ is the angle with respect to the axis of the powered shaft between opposing ends of adjoining switching plates, wherein $(\delta\Theta/\Theta) \times (W/T)$ defines a magnetic coefficient, the magnetic coefficient being maintained according to the relationship in a vehicle having a final reduction ratio greater than 3.3 to provide improved braking torque and reduced drag torque.

26. The apparatus of claim 25, wherein the relationship $0.7 \leq (W/w) \leq 1.5$ is satisfied, and w is a width of each permanent magnet.

* * * * *

UNITED STATES PATENT AND TRADEMARK OFFICE
CERTIFICATE OF CORRECTION

PATENT NO. : 6,725,982 B2
DATED : April 27, 2004
INVENTOR(S) : Yasunori Tani

It is certified that error appears in the above-identified patent and that said Letters Patent is hereby corrected as shown below:

Title page,
Item [56], References Cited, U.S. PATENT DOCUMENTS, add the following references:

-- 0860934A1   EPO            08/26/1998
   0948118A2   EPO            10/06/1999
   10127039    EPO            05/15/1998
   06189522    EPO            07/08/1994
   0367387     EPO            05/09/1990
   1098010     Great Britain  11/08/1965 --

Signed and Sealed this

Twentieth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,725,982 B2
DATED : April 27, 2004
INVENTOR(S) : Tani et al.

It is certified that error appears in the above-identified patent and that said Letters Patent is hereby corrected as shown below:

Column 29,
Line 27, "2.5" should read -- 2.25 --;

Column 30,
Line 57, "of at most" should read -- greater than --.

Signed and Sealed this

Twenty-sixth Day of October, 2004

JON W. DUDAS
*Director of the United States Patent and Trademark Office*